United States Patent
Palm et al.

(10) Patent No.: US 7,509,096 B2
(45) Date of Patent: Mar. 24, 2009

(54) WIRELESS ACCESS POINT SETUP AND MANAGEMENT WITHIN WIRELESS LOCAL AREA NETWORK

(75) Inventors: Stephen Palm, Irvine, CA (US); Jeffrey L. Thermond, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 736 days.

(21) Appl. No.: 10/660,849

(22) Filed: Sep. 12, 2003

(65) Prior Publication Data
US 2005/0068925 A1      Mar. 31, 2005

Related U.S. Application Data

(63) Continuation-in-part of application No. 10/653,798, filed on Sep. 3, 2003, now Pat. No. 7,333,462, which is a continuation-in-part of application No. 10/357,795, filed on Feb. 4, 2003, now Pat. No. 7,394,796.

(60) Provisional application No. 60/398,744, filed on Jul. 26, 2002.

(51) Int. Cl.
 *H04B 1/18*      (2006.01)
 *H04Q 7/24*      (2006.01)
(52) U.S. Cl. .............. 455/63.4; 455/193.1; 370/338
(58) Field of Classification Search .......... None
See application file for complete search history.

(56) References Cited

U.S. PATENT DOCUMENTS

| | | | |
|---|---|---|---|
| 6,486,832 B1* | 11/2002 | Abramov et al. | 343/700 MS |
| 2003/0119523 A1* | 6/2003 | Bulthuis | 455/456 |
| 2003/0222818 A1* | 12/2003 | Regnier et al. | 342/383 |

* cited by examiner

*Primary Examiner*—Lester Kincaid
*Assistant Examiner*—Joel Ajayi
(74) *Attorney, Agent, or Firm*—Garlick Harrison & Markison; Bruce E. Garlick; Holly L. Rudnick

(57) ABSTRACT

A Wireless Local Area Network (WLAN) processing component includes a network interface and a processor. The network interface interfaces the WLAN processing component to a plurality of Wireless Access Points (WAPs) of the WLAN, at least some of the plurality of WAPs having directional antennas. The WLAN processing component directs the plurality of WAPs to perform a plurality of beaconing operations, each of the beaconing operations corresponding to a respective WAP of the plurality of WAPs such that during the beaconing operation the respective WAP transmits a substantially constant power beacon. During the beaconing operations, the WLAN processing component directs non-beaconing WAPs having directional antennas to listen for the transmitted beacon, direct an approximate maximum gain vector of the directional antenna toward the transmitted beacon, determine a relative angular position of the approximate maximum gain vector, and measure a received strength of the transmitted beacon. The WLAN processing component then uses collected information to determine relative radio positions of the plurality of WAPs within the WLAN.

16 Claims, 19 Drawing Sheets

WIRELESS ACCESS POINT SETUP AND MANAGEMENT WITHIN WIRELESS LOCAL AREA NETWORK

CROSS REFERENCE TO RELATED APPLICATION

This application claims priority to U.S. Provisional Patent Application Ser. No. 60/398,744, filed Jul. 26, 2002, to U.S. Regular Utility patent application Ser. No. 10/357,795, filed Feb. 4, 2003 now U.S. Pat. No. 7,394,796 as a continuation-in-part thereof, and to U.S. Regular Utility patent application Ser. No. 10/653,798, filed Sep. 3, 2003 now U.S. Pat. No. 7,333,462 as a continuation-in-part thereof, all of which are incorporated herein by reference in their entirety for all purposes.

FIELD OF THE INVENTION

This invention relates generally to wireless local area networks; and more particularly to the management of service coverage areas within such wireless local area networks.

BACKGROUND OF THE INVENTION

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. The Public Switched Telephone Network (PSTN) is probably the best-known communication network that has been in existence for many years. The Internet is another well-known example of a communication network that has also been in existence for a number of years. These communication networks enable client devices to communicate with each other on a global basis. Wired Local Area Networks (LANs), e.g., Ethernets, are also quite common and support communications between networked computers and other devices within a serviced area. LANs also often link serviced devices to Wide Area Networks and the Internet. Each of these networks is generally considered a "wired" network, even though some of these networks, e.g., the PSTN, may include some transmission paths that are serviced by wireless links.

Wireless networks have been in existence for a relatively shorter period. Cellular telephone networks, wireless LANs (WLANs), and satellite communication networks, among others, are examples of wireless networks. Relatively common forms of WLANs are IEEE 802.11(a) networks, IEEE 802.11(b) networks, and IEEE 802.11(g) networks, referred to jointly as "IEEE 802.11 networks." In a typical IEEE 802.11 network, a wired backbone network couples to a plurality of Wireless Access Points (WAPs), each of which supports wireless communications with computers and other wireless terminals that include compatible wireless interfaces within a serviced area. The wired backbone network couples the WAPs of the IEEE 802.11 network to other networks, both wired and wireless, and allows serviced wireless terminals to communicate with devices external to the IEEE 802.11 network.

WLANs provide significant advantages when servicing portable devices such as portable computers, portable data terminals, and other devices that are not typically stationary and able to access a wired LAN connection. However, WLANs provide relatively low data rate service as compared to wired LANs, e.g., IEEE 802.3 networks. Currently deployed wired networks provide up to one Gigabit/second bandwidth and relatively soon, wired networks will provide up to 10 Gigabit/second bandwidths. However, because of their advantages in servicing portable devices, WLANs are often deployed so that they support wireless communications in a service area that overlays with the service area of a wired network. In such installations, devices that are primarily stationary, e.g., desktop computers, couple to the wired LAN while devices that are primarily mobile, e.g., laptop computers, couple to the WLAN. The laptop computer, however, may also have a wired LAN connection that it uses when docked to obtain relatively higher bandwidth service.

When a decision is initially made to install a WLAN in a premises, the WLAN must first be engineered. In such engineering, the lay out of the premises, e.g., warehouse, office space, campus environment, etc. is first considered. In most installations, wireless coverage is desired across all areas of the premises. The deployment of the WAPs within the premises is the most critical step in the WLAN engineering. Because the conductance of Radio Frequency (RF) transmissions through building walls and other obstacles in the premises is dependent upon respective structure, the structural aspects of the premises must be carefully considered when determining WAP placement. However, most WAP placement decisions are subjectively made, based upon the care and experience level of the installer.

During the initial WLAN installation, the WAP placement is fixed. Thus, the WAP placement cannot address changes in the topology and structure of the premises. Such changes in the topology and structure may include the addition of walls, the additions of partitions, the addition of wiring that will affect propagation of RF transmissions, and other characteristics. Problems that typically result due to poor WAP placement include poor channel utilization, interference between WAPs, WAP capacity shortages, and other shortcomings. These operational problems, however, will typically only be seen as poor WLAN performance. The WLAN network installer/administrator, however, has no way of determining whether these problems are caused by equipment deficiencies, the nature of the premises, WAP placement, or lack of capacity in the WAPs.

Thus, there is a need in the art for improvements in the management of WAPs servicing a WLAN.

SUMMARY OF THE INVENTION

A method for operating a Wireless Local Area Network (WLAN) serviced by a plurality of Wireless Access Points (WAPs), at least some of the plurality of WAPs having directional antennas, includes determining relative radio positions of the plurality of WAPs within the WLAN. Such result is reached by performing a plurality of beaconing operations, each of the beaconing operations corresponding to a respective WAP of the plurality of WAPs such that during the beaconing operation the respective WAP transmits a substantially constant power beacon. During each beaconing operation, at least one non-beaconing WAP of the plurality of WAPs that has a directional antenna listens for the transmitted beacon, directs an approximate maximum gain vector of the directional antenna toward the transmitted beacon, determines a relative angular position of the approximate maximum gain vector, measures a received strength of the transmitted beacon, and records the relative angular position of the approximate maximum gain vector and the received strength of the transmitted beacon. The plurality of recorded relative angular positions of the approximate maximum gain vectors and a plurality of recorded received strengths of the transmitted beacons are then processed to determine relative radio positions of the plurality of WAPs within the WLAN. With this method, transmitting the substantially constant power beacon may include transmitting the beacon omni directionally.

This operation may include, based upon the relative radio positions of the plurality of WAPs within the WLAN, determining that wireless coverage within a premises serviced by the plurality of WAPs is deficient in at least one location of the premises. With this determined, the method may include determining a repositioning of at least one of the plurality of WAPs to remedy the deficiency. In determining the repositioning of at least one of the plurality of WAPs to remedy the deficiency, the method may include estimating relative physical positions of the plurality of WAPs based upon the relative radio positions of the plurality of WAPs. Based upon estimates of the relative physical positions of the plurality of WAPs, a physical repositioning of the at least one of the plurality of WAPs that will remedy the deficiency is then determined.

Determining the repositioning may include receiving relative physical positions of the plurality of WAPs based upon physical measurements, physical layout approximation, GPS data collection, or other sources. The relative physical positions of the plurality of WAPs may then be correlated with the relative radio positions of the plurality of WAPs. In this case, then determining the repositioning of at least one of the plurality of WAPs to remedy the deficiency is based upon the correlation of the relative physical positions of the plurality of WAPs with the relative radio positions of the plurality of WAPs.

In another operation, the deficiency is identified and the method includes determining an alteration of an antenna gain pattern of at least one of the plurality of WAPs having a directional antenna to remedy the deficiency. In another operation, the deficiency is identified and the method includes determining an alteration of transmit power of at least one of the plurality of WAPs having a directional antenna to remedy the deficiency. In still another operation, the deficiency is identified and the method includes determining that an additional WAP is required to remedy the deficiency and recommending a placement of the additional WAP with respect to the relative radio positions of the plurality of WAPs within the WLAN.

Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1:
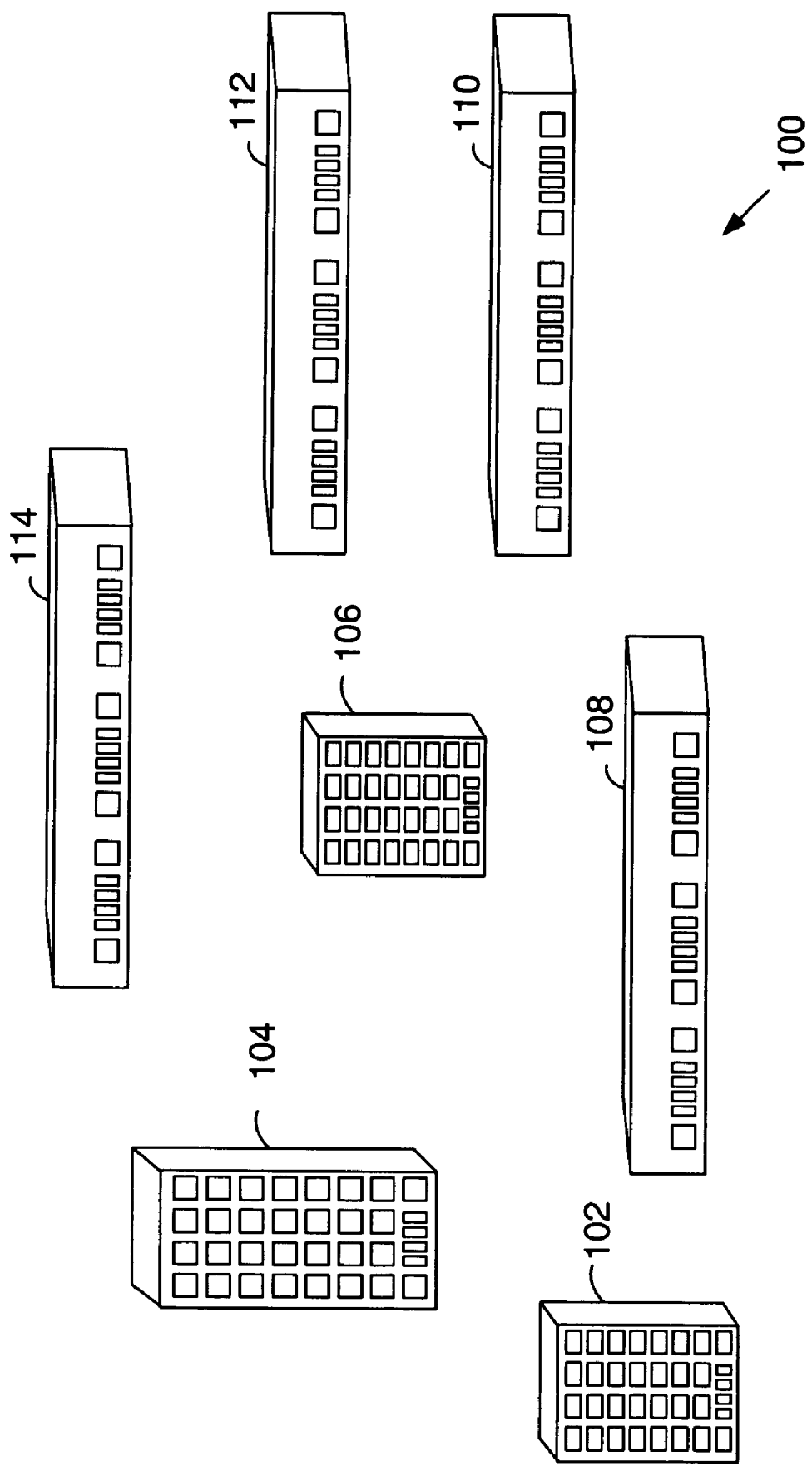
FIG. 1 is a system diagram illustrating a premises in which a Wireless Local Area Network (WLAN) constructed according to the present invention is deployed.

FIG. 1 is a system diagram illustrating a premises 100 in which a Wireless Local Area Network (WLAN) constructed according to the present invention is deployed. The premises 100 (campus) includes office buildings 102, 104, 106 and industrial buildings 108, 110, 112, and 114. The premises 100 may correspond to a company such as a technology company, a seller of goods, a service company, or another type of company. Contained within each of the office buildings 102, 104, and 106 are a number of offices, each of which provides a working space for at least one person. Each of the industrial buildings 108, 110, 112, and 114 provides space for manufacturing, storage, and/or another purpose. People also work within industrial buildings 108, 110, 112, and 114.

Contained within each of these buildings 102-114 are computer workstations, computer servers, printers, FAX machines, phones, and other electronic devices. Each of these electronic devices has its communication requirements. For example, computer workstations, computer servers, and printers each require data communication service. Such data communication service requires that the devices can communicate with other devices located within the premises 100 and with devices located external to the premises 100 across one or more data networks. The FAX machines and phones require coupling to one another and to the Public Switched Telephone Network (PSTN).

Figure 2:
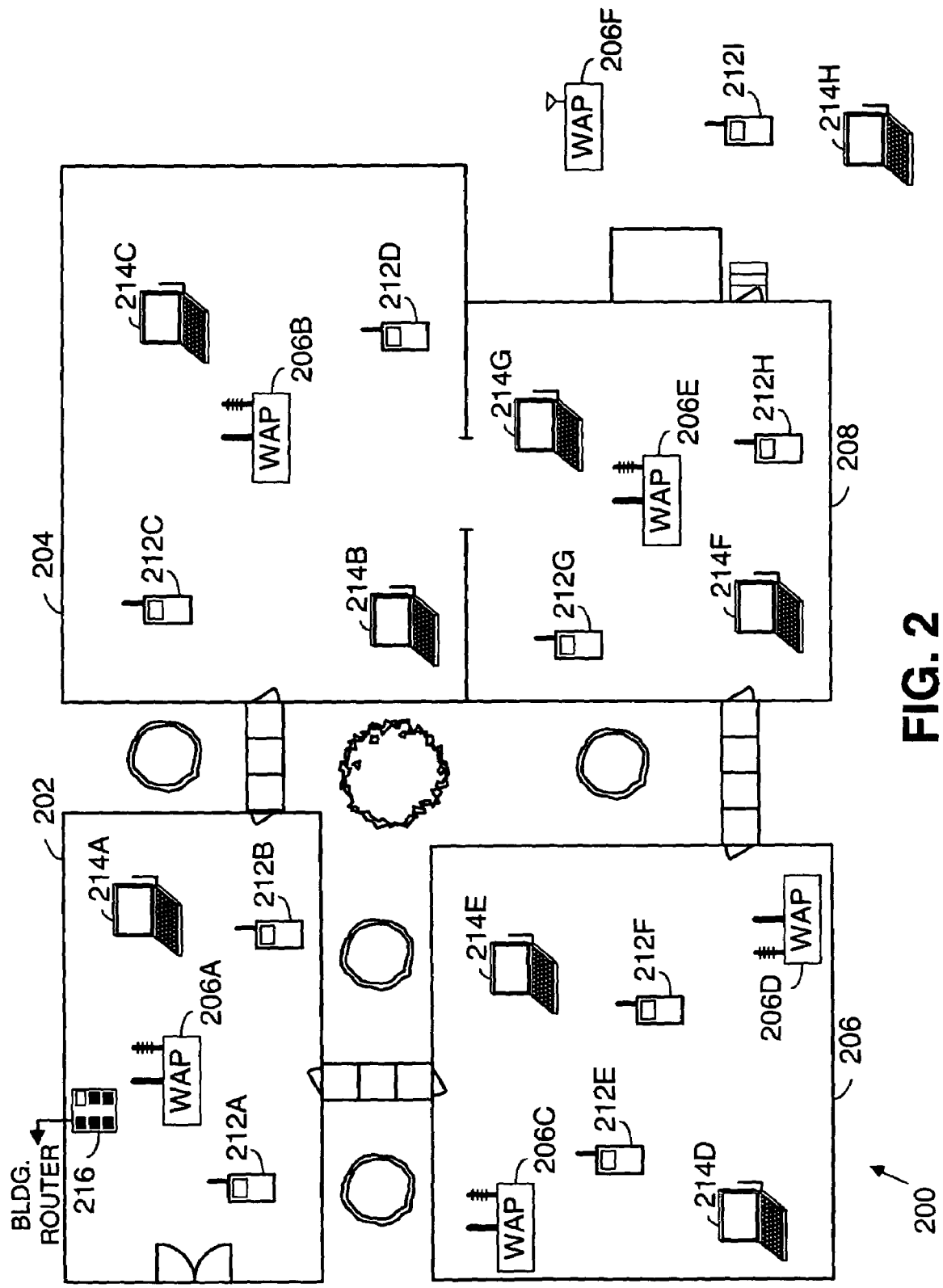
FIG. 2 is a partial system diagram illustrating a portion of the campus of FIG. 1 in which wireless communications are serviced according to the present invention.

FIG. 2 is a partial system diagram illustrating a portion of the campus of FIG. 1 in which wireless communications are serviced according to the present invention. A building floor 200 shown in FIG. 2 may be a lower floor of one of the buildings of FIG. 1, e.g., building 102. The building floor 200 includes a plurality of rooms 202, 204, 206, and 208. Each of these rooms 202, 204, 206, and 208 has placed therein WAPs 206A, 206B, 206C, 206D, and 206E, respectively, that service corresponding areas. Further, an external WAP 206F services an area external to room 208 of building floor 200. Each of these WAPs 206A-206F couples to a wired network infrastructure that may include a building router 216.

Serviced within the building floor 200 are wireless telephones/data terminals 212A-212I and laptop computers 214A-214H, together "wireless terminals." Each of these wireless terminals wirelessly communicates with a servicing WAP. For example, laptop computer 214A and wireless terminals 212A and 212B wirelessly communicate with WAP 206A (in their illustrated positions). Each of the WAPs 206A-206E supports wireless communications primarily within a designated area respectively. However, the coverage area of each WAP 206A-206E extends beyond the boundaries of the serviced rooms 202-208 so that overlapping coverage areas exist. For example, WAPs 206A and 206C provide service between rooms 202 and 206 so that wireless terminals that roam between the rooms continue to receive wireless communication service when roaming between the rooms 202 and 206. Further, WAP 206E supports wireless communications outside of the floor 200 to service laptop computer 214H and wireless terminal 212I.

Figure 3:
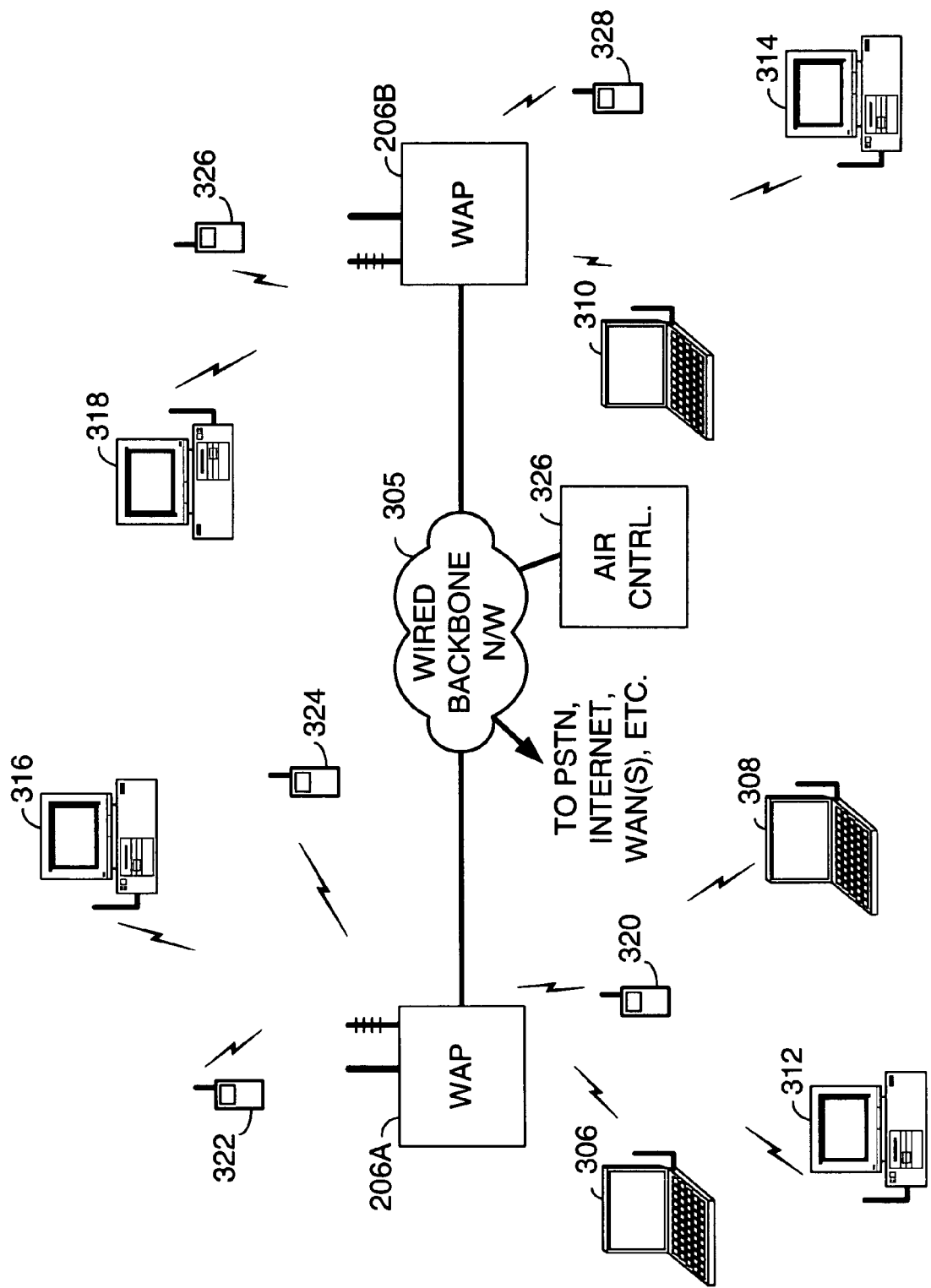
FIG. 3 is a partial system diagram illustrating a portion of a campus in which wireless communications are serviced according to the present invention.

FIG. 3 is a block diagram partially illustrating a portion of the WLAN of FIG. 2 that supports operations according to the present invention. The portion of the network shown includes WAPs 206A and 206B that support wireless communications within a serviced area, for example, the rooms 202 and 204 of FIG. 2. The WAPs 206A and 206B couple to a wired backbone network 305. The WAPs 206A and 206B service wireless communications for laptop computers 306, 308, and 310, desktop computers 312, 314, 316, and 318, and wireless telephones/data terminals 320, 322, 322, 324, 326, and 328, together "wireless terminals." Note that while different numbering is used for the wireless terminals of FIG. 3, they are the same as, or similar to, the wireless terminals of FIG. 2. Service coverage areas supported by WAPs 206A and 206B partially overlap. The wired backbone network 305 couples to one or more data networks and to an air controller 326.

As illustrated, each of the WAPs 206A and 206B includes two antennas. A first antenna of the two antennas is a dynamically directional antenna that couples to a first radio of a respective WAP and a second antenna of the two antennas couples to a second radio of a respective WAP. The directional antennas and first radios of the WAPs 206A and 206B service wireless communications with those of the laptop computers 306, 308, and 310, desktop computers 312, 314, 316, and 318, and wireless telephones/data terminals 320, 322, 324, 326, and 328, together "wireless terminals," operating within respective service areas. As will be described further with reference to FIGS. 4-10, the WAPs 206A and 206B are controlled by the air controller 326 so that their respective service areas do not unduly interfere with one another and such that satisfactory service is provided therein. In such case, each of WAPs 206A and 206B provides service to a subset of the wireless terminals.

In controlling the WAPs 206A and 206B, the air controller 326 directs the WAPs 206A and 206B to alter the gain pattern of their directional antennas, to modify their first radio transmit powers, and to alter the channels upon which they operate, among other directions. The control of the WAPs 206A and 206B by the air controller 326 is based upon WAP operational reports received from the WAPs. Second radios of the WAPs 206A and 206B listen to transmissions from at least one of the wireless terminals and WAPs and collect non-participatory WAP data. The WAPs 206A and 206B produce the WAP operational reports based upon the non-participatory WAP data and forward the WAP operational reports to the air controller 326. In some operations, the WAP operational reports may also include information gathered by the WAPs 206A and 206B based upon the communications serviced by the first radio—participatory WAP data. Participatory WAP data may include received carrier signal strengths, carrier to interference ratios, bit error rates, dropped link occurrences, and channel utilization. Non-participatory WAP data may include received carrier signal strengths, carrier to interference ratios, and channel utilizations. Based upon the WAP operational reports, the air controller 326 controls the service areas of the WAPs 206A and 206B. Resultantly, the air controller 326 reduces Radio Frequency (RF) interference among the plurality of WAPs, ensures that coverage is provided within all desired areas of the premises, and provides specialized service when required, e.g., VoIP service.

According to another aspect of the present invention, that will be described further with reference to FIG. 7B and FIG. 7C, the WAPs 206A and 206B also control the directionality (and transmit power) of serviced wireless terminals. In performing this function, the WAPs 206A and 206B listen to the strength of the received transmissions from a managed wireless terminal, determine a gain vector for a directional antenna of the wireless terminal and have the wireless terminal control its directional antenna to meet this gain vector. Generally, the gain vector will correspond to the location of a servicing WAP, WAP 206A for example. By directing the gain of the directional antenna of the wireless terminal toward the servicing WAP 206A, interference with non-servicing WAPs is reduced and the ability of the servicing WAP 206A to service the wireless terminal is improved. Still other aspects of the present invention will be described with reference to FIG. 11 that detail how wireless terminals may be operated within a WLAN.

Figure 4:
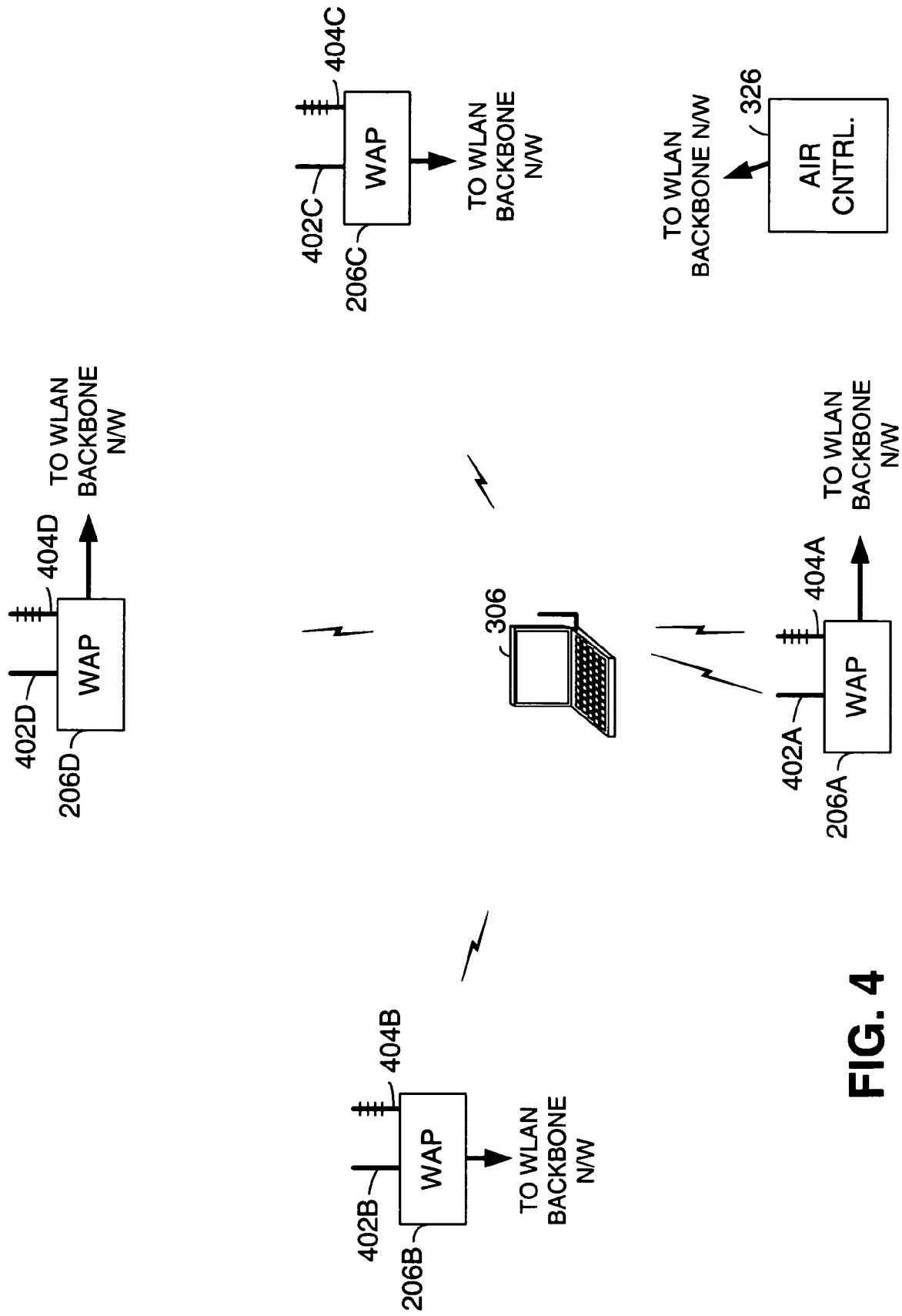
FIG. 4 is a partial system diagram illustrating a WLAN constructed according to the present invention.

FIG. 4 is a partial system diagram illustrating a WLAN constructed according to the present invention. As shown in FIG. 4, the WAPs 206A, 206B, 206C, and 206D are located across the serviced premises. Each of the WAPs 206A-206D and the air controller 326 couples to the wired backbone network 305 (not in FIG. 4). As is further illustrated, each of the WAPs 206A-206D includes a directional antenna 404A-404D, respectively, and a second antenna, 402A-402D, respectively.

WAP 206A services communications with a laptop computer 306 using its first radio and its directional antenna 404A. However, according to the present invention, each of the WAPs 206A, 206B, 206C, and 206D also listens to transmissions from the laptop computer 306 (and also to transmissions from the WAP 206A in some embodiments). In these operations, the WAPs 206A-206D use their antennas 402A-402D and second radios, respectfully, to listen to transmissions of the laptop computer 306.

As will be further described herein with reference to FIGS. 5-10, in listening to transmissions of the laptop computer 306 and each other transmitting wireless terminal within the service premises and other sources of interference, the WAPs generate WAP operational reports. These WAP operational reports are forwarded by the WAPs 206A-206D to the air controller 326. Based upon the WAP operational reports the air controller produces directions that are sent to one or more of the WAPs 206A-206D. Then, based upon its directions, the WAPs 206A-206D alter the operations of their directional antennas 404A-404D, respectively, alter the transmission power of their first radios, and/or alter the channels of operation of the first radios. According to another aspect of the present invention, when the WAPs 206A-206D include only a single radio and a single antenna, the WAPs 206A-260D listen to transmissions of non-serviced wireless terminals when they are idle with respect to their serviced wired terminals. Thus, with the embodiment, the WAPs 206A-206D are able to collect non-participatory WAP data and participatory WAP data using a single radio.

As will be further described with reference to FIGS. 7B and 11, the wireless terminal may include a directional antenna that is employed to direct the gain pattern of the antenna toward a servicing WAP. The servicing WAP is selected from the available WAPs 206A-206D based upon the service characteristics of the WAP. The service characteristics may take a number of forms and are described further herein with reference to FIG. 11.

Figure 5:
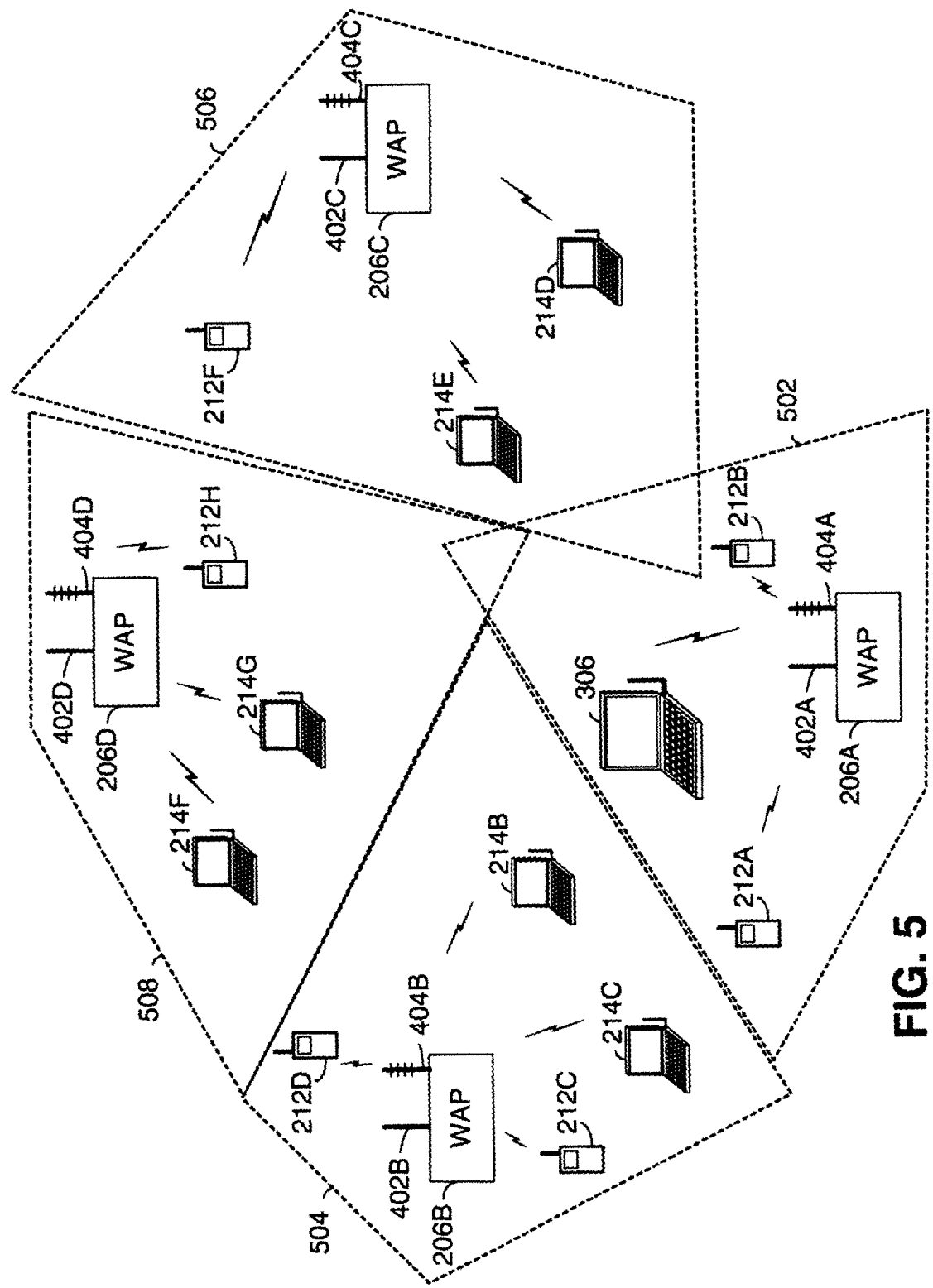
FIG. 5 is a partial system diagram illustrating in more detail the WLAN of FIG. 4.

FIG. 5 is a system diagram illustrating in more detail the WLAN of FIG. 4 that operates according to the present invention. FIG. 5 also illustrates the manner in which WAPs 206A-206D service wireless terminals operating within the premises. As shown, WAP 206A provides RF coverage within a respective service area 502 for wireless terminals 212A, 212B, and 306. Likewise, WAP 206B provides RF coverage within a respective service area 504 for wireless terminals 212C, 212D, 214B and 214C. WAP 206C provides RF coverage within a respective service area 506 for wireless terminals 214D, 214E, and 212F. Finally, WAP 206D provides RF coverage within a respective service area 508 for wireless terminals 212H, 214F, and 214G.

As is illustrated, each of the service areas 502, 504, 506, and 508 has an irregular shape. While these irregular shapes are exaggerated for the illustrative purposes of FIG. 5, each of the WAPs 206A-206D includes directional antennas 404A-404D, respectively, that are capable of supporting respective service areas having irregular (and unique) shapes. As was previously discussed herein, the directional antennas 404A-404D, the transmit power provided thereto by the coupled first radios, and the channel usage of the first radios, are altered via direction from the air controller. As part of this alteration process, varying the directionality of the directional antennas 404A-404D, as well as the transmit power applied to the directional antennas 404A-404D, will alter the service coverage areas 502, 504, 506, and 508, respectively. Such alteration in the service coverage areas 502-508 results in reduced interference among the WAPs 206A-206D. In some operations, WAPs 206A-206D have differing wireless terminal density within their service coverage areas 502-508. By altering these service coverage areas, the air controller equalizes load among the WAPs 206A-206D. Further, by altering channel usage, varying the directionality of the directional antennas 404A-404D, as well as the transmit power applied to the directional antennas 404A-404D that are supported by the WAPs 206A-206D, the air controller ensures that specialized service requirements, e.g. Quality of Service, VoIP service, are met.

Figure 6B:
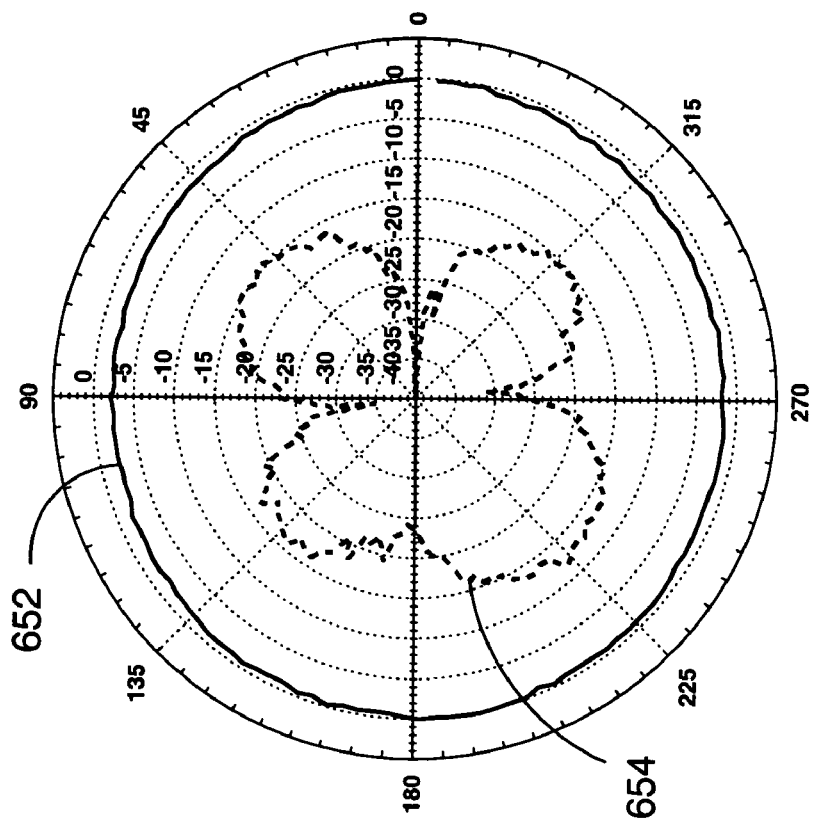
FIGS. 6A and 6B are graphs illustrating various antenna gain patterns of WAP directional antennas operating according to the present invention.
Figure 6A:
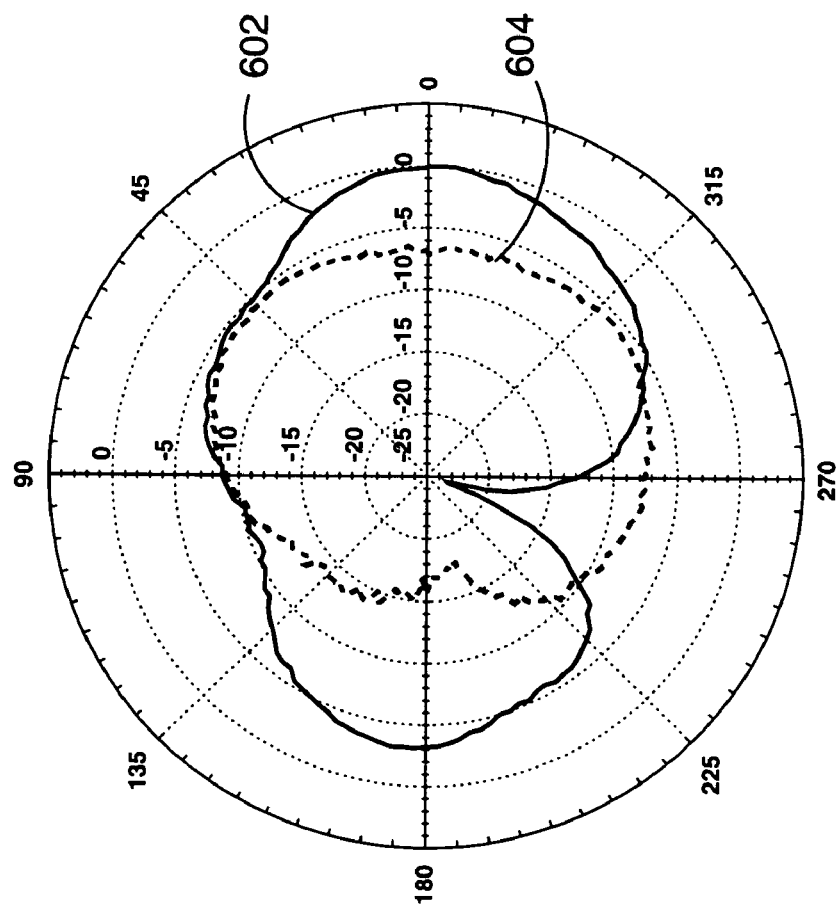

FIGS. 6A and 6B are graphs illustrating various antenna gain patterns of WAP directional antennas operating according to the present invention. As illustrated in FIG. 6A, a first antenna gain pattern 602 differs from a second antenna gain pattern 604. However, neither gain pattern of 602 or 604 is symmetrical about the antenna. The antenna gain patterns 602 and 604 may be those provided by the directional antennas 404A-404D of one of the WAPs 206A-206D.

As shown in FIG. 6B, a first antenna gain pattern 652 is substantially symmetrical. Such would be the case with a monopole or dipole antenna such as the antennas 402A-402D of the WAPs 206A-206B that couple to respective second radios. The second antenna gain pattern 654 may be a gain pattern that is produced by directional antennas 404A-404D of the WAPs 206A-206D.

Figure 7A:
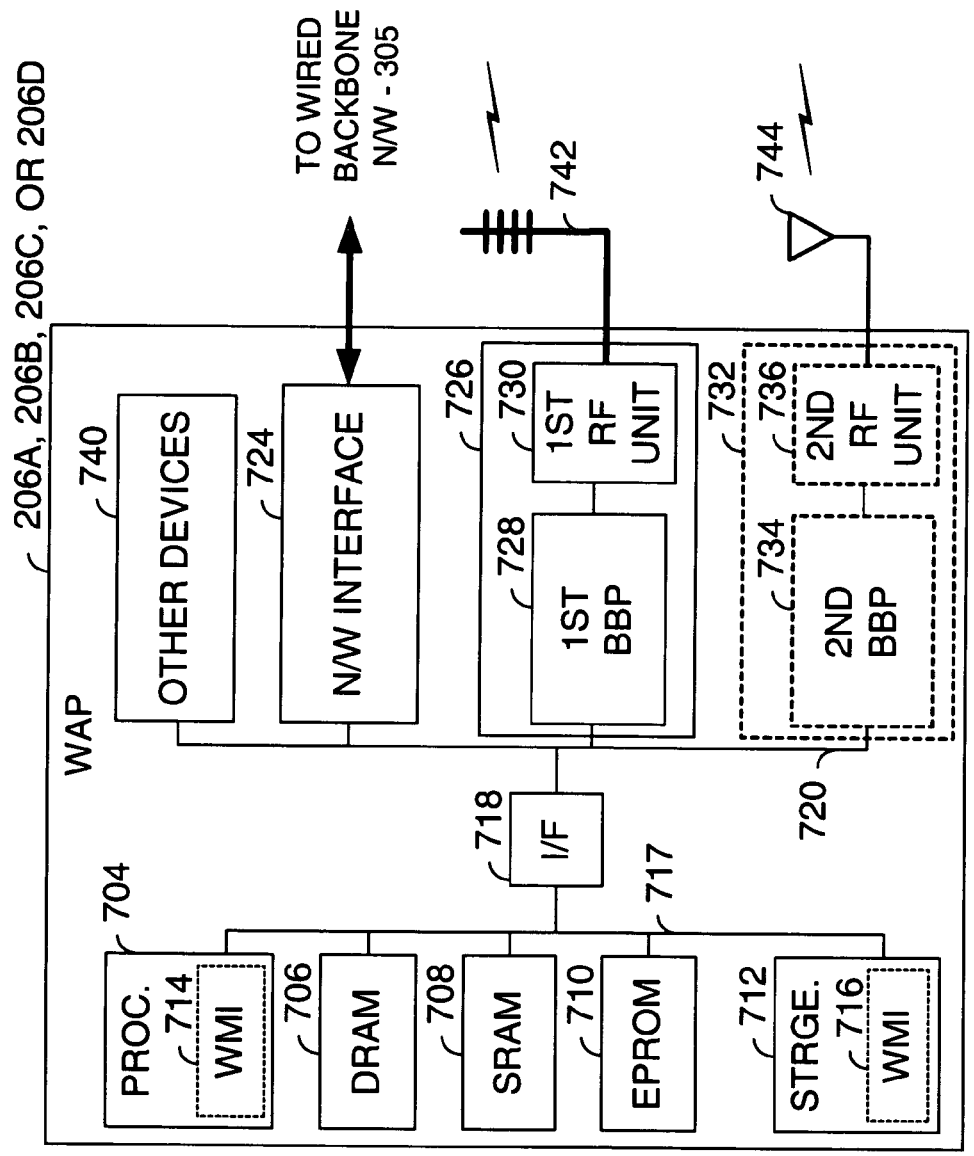
FIG. 7A is a block diagram illustrating a WAP constructed according to the present invention.

FIG. 7A is a block diagram illustrating a WAP 206A, 206B, 206C, or 206D constructed according to the present invention. The WAP 206A includes a processor 704 and one or more storage devices that may include dynamic RAM 706, static RAM 708, EPROM 710, and/or storage device 712, such as a hard drive, optical drive, tape drive, etc. These components intercouple via a local bus 717 and couple to a peripheral bus 720 via an interface 718. The processor 704 may be any type of processing device capable of executing software instructions. The processor 704 may be a single integrated circuit or a processing module including a plurality of integrated circuits.

The WAP 206A also includes a network interface 724, which couples the WAP 206A to the wired backbone network 305. The WAP 206A also includes a first radio 726, a second radio 732, a directional antenna 742, and an antenna 744. The first radio 726 includes a first baseband processor 728 and a first RF unit 730 that couples to the directional antenna 742. The second radio 732 includes a second baseband processor 734 and a second RF unit 736 that couples to antenna 744. The embodiment of the WAP 206A illustrated supports at least one standardized operating protocol, e.g., IEEE 802.11(a), IEEE 802.11(b), IEEE 802.11(g), etc.

In performing operations according to the present invention, the WAP 206A may execute software instructions, i.e., WAP Management Instructions (WMIs). WMIs enable the WAP 206A to perform the operations of the present invention. In executing the WMIs, the WMIs 716 are loaded into the storage unit 712 and some or all of the WMIs 714 are loaded into the processor 704 for execution. During this process, some of the WMIs 716 may be loaded into the DRAM 706. In other embodiments, however, the WAP 206A may operate according to the present invention based upon hardware function, firmware instructions, or a combination of any/all of these.

Figure 7B:
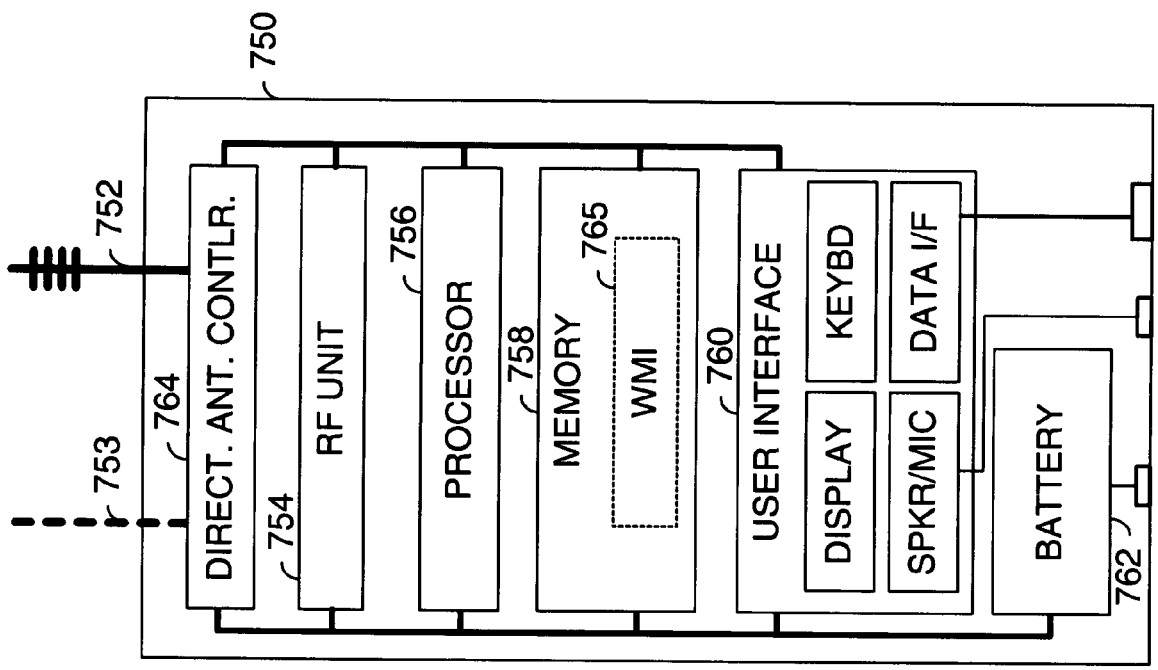
FIG. 7B is a block diagram illustrating the components of a wireless terminal that operates according to the present invention.

FIG. 7B is a block diagram illustrating the components of a wireless terminal that operates according to the present invention. The wireless terminal 750 includes a directional antenna, a RF unit 754, a processor 756, and a memory 758. The directional antenna includes directional antenna controller 764 and includes at least one antenna element 752 and/or 753. The RF unit 754 couples to the directional antenna, which may be located internal or external to the case of the wireless terminal 750 (external antennas are shown in FIG. 7B). In the described embodiment, the processor 756 controls the directionality of the directional antenna via the directional antenna controller 764.

The processor 756 may be an Application Specific Integrated Circuit (ASIC) or another type of processor that is capable of operating the wireless terminal 750 according to the present invention. The memory 758 includes both static and dynamic components, e.g., DRAM, SRAM, ROM, EEPROM, etc. In some embodiments, the memory 758 may be partially or fully contained upon an ASIC that also includes the processor 756. A user interface 760 includes a display, indicators, a keyboard, a speaker, a microphone, and/or a data interface, and may include other user interface components. The directional antenna controller 764, the RF unit 754, the processor 756, the memory 758, and the user interface 760 couple via one or more communication buses/links. A battery 762 also couples to and powers the RF unit 754, the processor 756, the memory 758, and the user interface 760. The structure of the wireless terminal 750 illustrated is only an example of one wireless terminal structure. Many other varied wireless terminal structures could be operated according to the teachings of the present invention.

According to one aspect of the present invention that will be described further with reference to FIG. 11, the wireless terminal 750 controls the directionality of its directional antenna in operating within the WLAN. In such case, the servicing WAPs may or may not have directional antennas. According to another aspect of the present invention, the WAPs 206A and 206B assist in the control of the directionality (and transmit power) of the serviced wireless terminal 750. In performing this function, the WAPs 206A and 206B determine the strength of the transmissions received from the managed wireless terminal 750, determine a gain vector for a directional antenna of the wireless terminal 750 and have the wireless terminal 750 control its directional antenna to meet this gain vector. Generally, the gain vector will correspond to the location of a servicing WAP, WAP 206A for example. By directing the gain of the directional antenna of the wireless terminal 750 toward the servicing WAP 206A, interference with non-servicing WAPs is reduced and the ability of the servicing WAP 206A to service the wireless terminal is improved. The wireless terminal 750 of FIG. 7B supports these operations.

In performing the operations of the present invention, the wireless terminal 750 may execute software instructions, i.e., WAP Management Instructions (WMIs) 765. WMIs 765 enable the wireless terminal 750 to perform the operations of the present invention. In executing the WMIs, the WMIs 765 are loaded from memory 758 into the processor 756 for execution. In other embodiments, however, the wireless terminal 750 may operate according to the present invention based upon hardware function, firmware instructions, or a combination of any/all of these.

Figure 8:
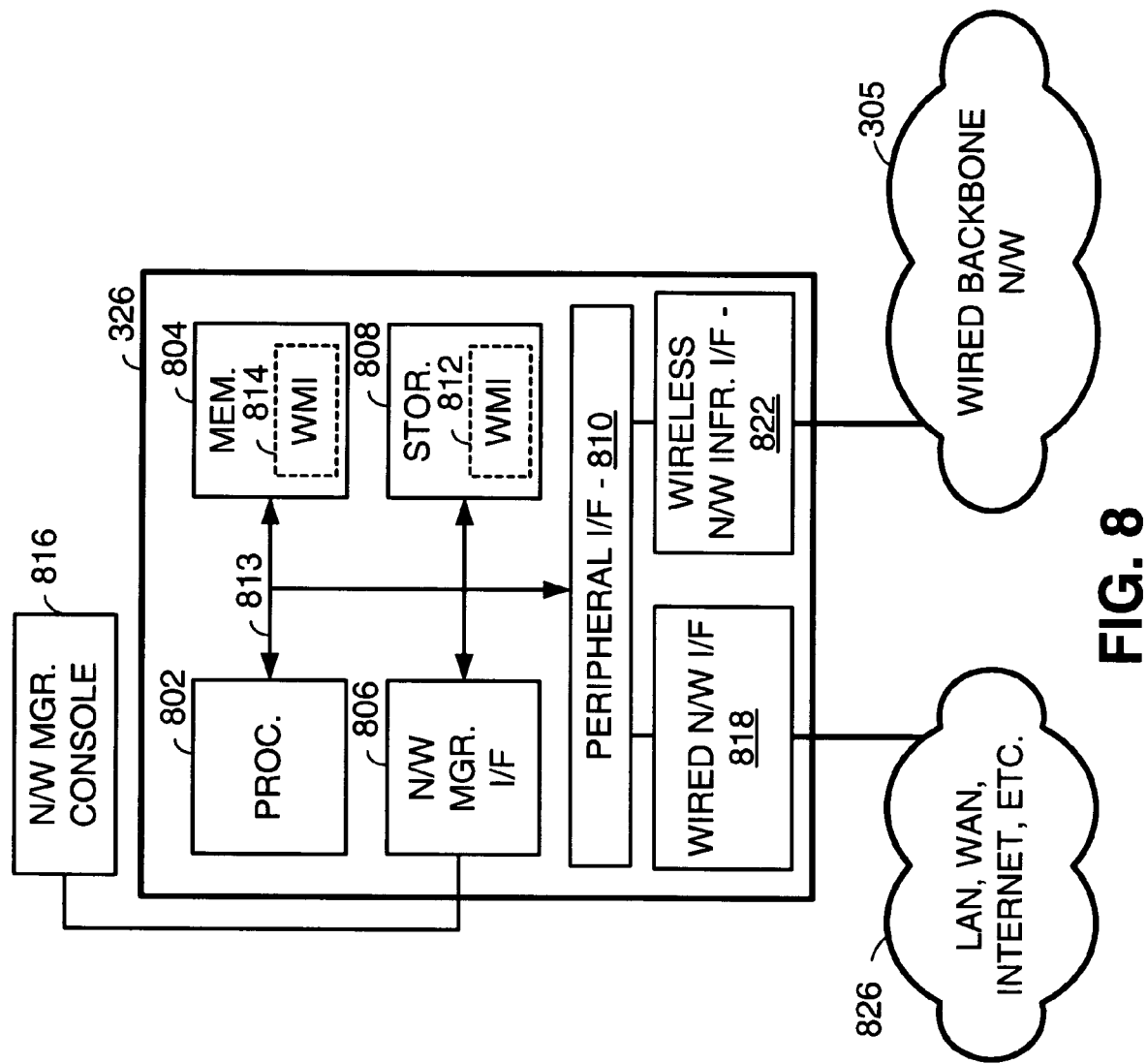
FIG. 8 is a block diagram illustrating an air controller constructed according to the present invention.

FIG. 8 is a block diagram illustrating an air controller 326 constructed according to the present invention. The air controller 326 may be a general-purpose computer that has been programmed and/or otherwise modified to perform the particular operations described herein. The air controller 326 includes a processor 802, a memory 804, a network manager interface 806, a storage 808 and a peripheral interface 810, all of which couple via a processor bus 813. The processor 802 may be a microprocessor or another type of processor that executes software instructions to accomplish programmed functions. The memory 804 may include DRAM, SRAM, ROM, PROM, EPROM, EEPROM, or another type of memory in which digital information may be stored. The storage 808 may be magnetic disk storage, magnetic tape storage, optical storage, or any other type of device, which is capable of storing digital instructions and data.

The network manager interface 806 couples to a network manager console 816, which allows a network manager to interface with the air controller 326. The network manager console 816 may be a keypad/display or may be a more complex device, such as a personal computer, which allows the manager to interface with the air controller 326. However, the network manager may interface with the air controller 326 using other techniques as well, e.g., via a card coupled to the peripheral interface 810.

The peripheral interface 810 couples to a wired network interface 818 and to wireless network infrastructure interface 822. The wired network interface 818 couples the air controller 326 to at least one network 826 that may include a Local Area Network (LAN), a Wide Area Network (WAN), or the Internet. The wireless network infrastructure interface 822 couples the air controller 326 to the wired backbone network 305.

WAP Management Instructions (WMIs) 812 are loaded into the storage 808 of the air controller 326. Upon their execution, a portion of the WMIs 812 is downloaded into memory 804 (as WMI 814). The processor 802 then executes the WMIs 814 to perform the operations described herein performed by the air controller 326. The programming and operation of digital computers is generally known to perform such steps. Thus, the manner in which the processor 802 and the other components of the air controller 326 function to perform these operations are not further described herein.

Figure 9A:
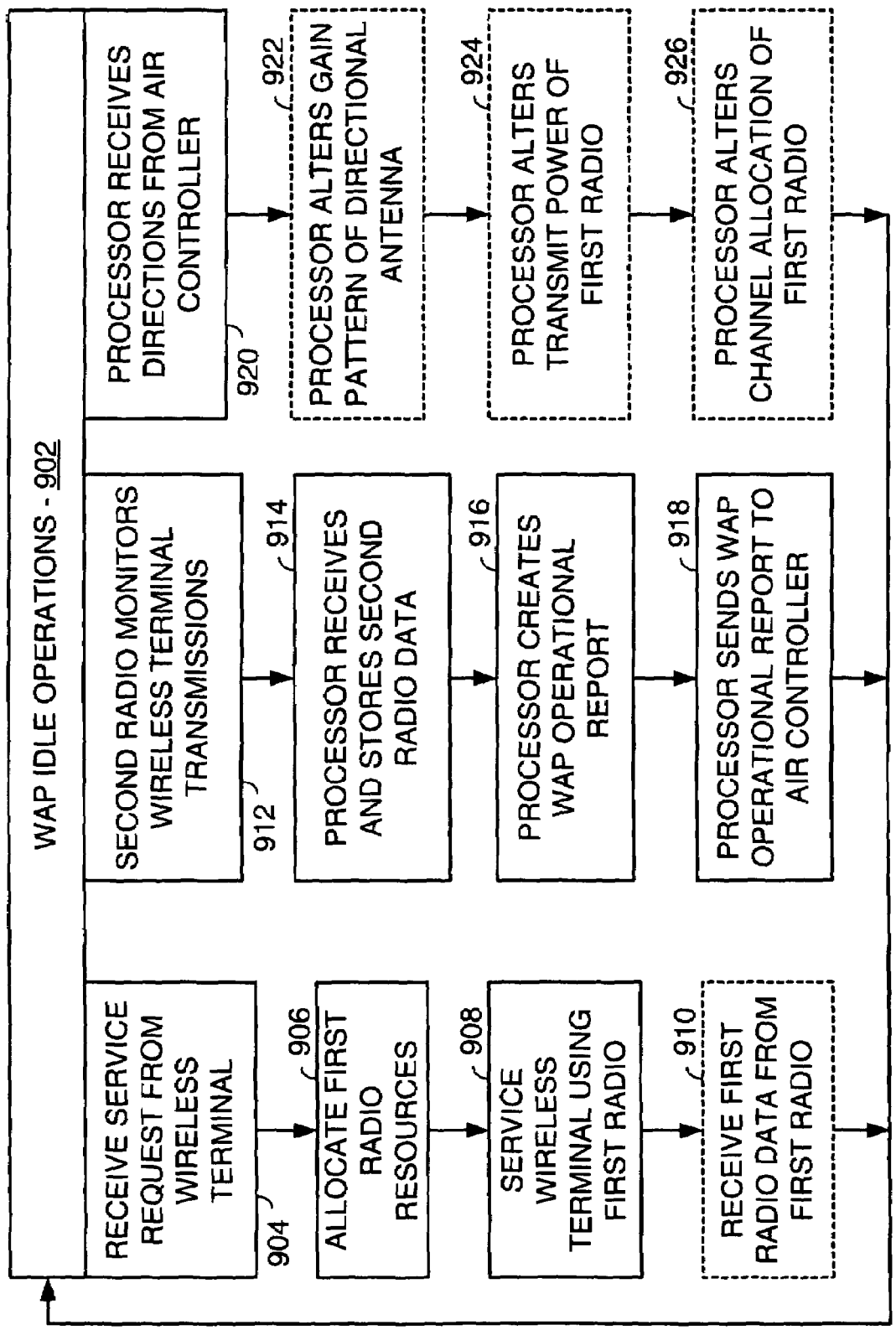
FIGS. 9A and 9B are a logic diagrams illustrating WAP operations according to the present invention.
Figure 9B:
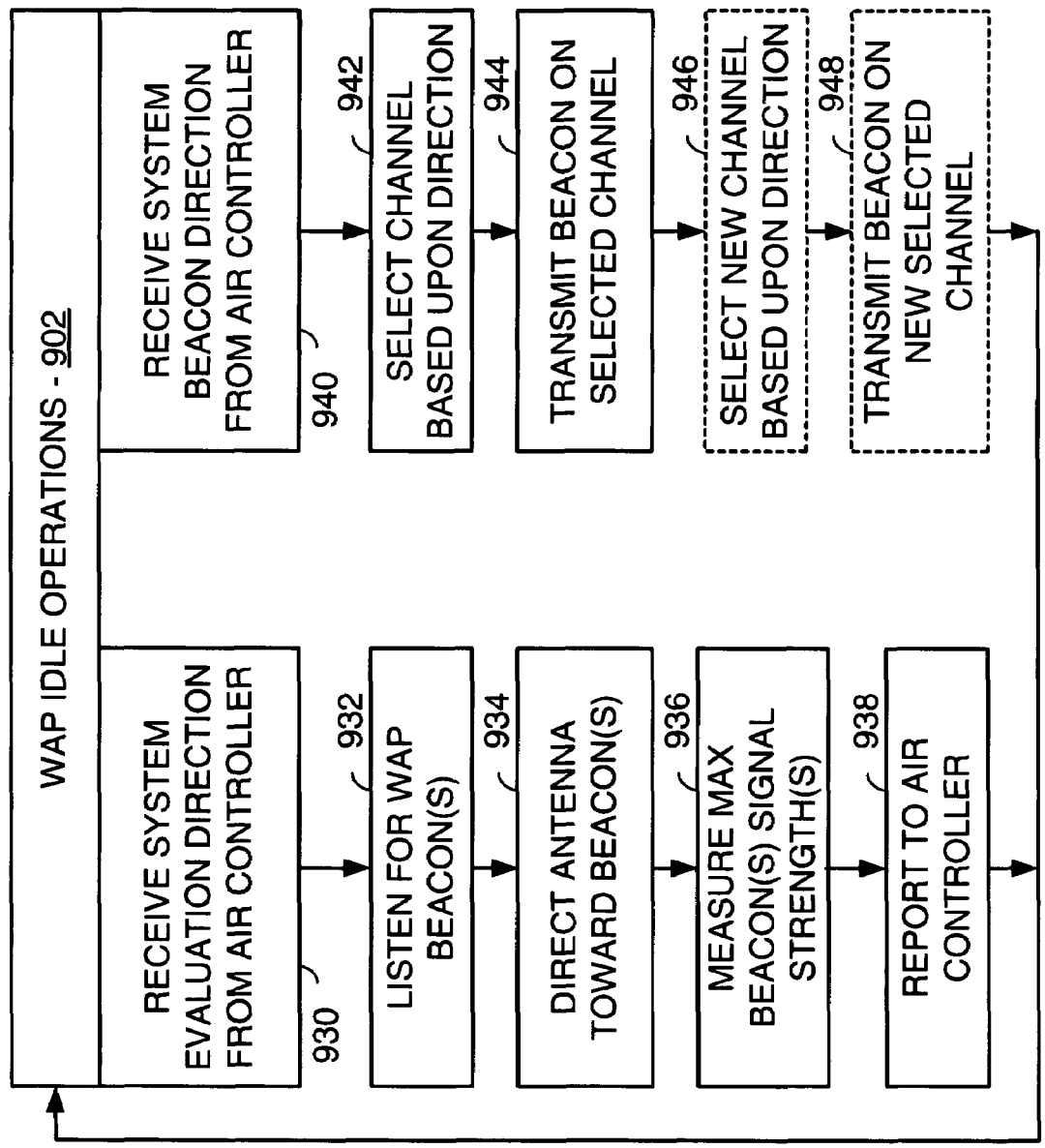

FIGS. 9A and 9B are logic diagrams illustrating WAP operations according to the present invention. Referring particularly to FIG. 9A, operation of the WAP remains idle state until action according to the present invention commences (step 902). From step 902, the WAP may receive a service request from a wireless terminal (step 904), may employ its second radio to monitor wireless terminal transmission (step 912), may receive directions from an air controller (step 920), may receive a system evaluation direction from the air controller (step 930), or may receive a system beacon direction from the air controller (step 940).

The WAP may receive a service request from any wireless terminal operating in the WAP's service area (step 904). From step 904, the WAP allocates first radio resources for servicing the wireless terminal (step 906). The manner in which a wireless terminal requests service from the WAP and the manner in which the WAP responds may be defined according to a standardized operating protocol, e.g. IEEE 802.11(a), IEEE 802.11(b), or IEEE 802.11(g). After first radio resources are allocated, the WAP services the wireless terminal using its first radio (step 908). In servicing the wireless terminal, the WAP may optionally receive participatory WAP data from the first radio (step 910). Once the communication has been fully serviced, operation returns from step 910 to step 902.

From step 912 in which the second radio monitors wireless terminal and/or WAP transmissions, the processor of the WAP receives and stores the non-participatory WAP data (step 914). As has been previously described, the second radio of the WAP listens to wireless terminal and/or WAP transmissions within the WLAN. In this fashion, the second radio is able to determine when a conflict or sub optimal operating condition exists. In performing this type of listening, the second radio gathers non-participatory WAP data. Optionally, the first radio gathers participatory WAP data that relates to its serviced communications.

In another embodiment of the present invention, each WAP only includes a single radio. In this embodiment, the single radio collects participatory WAP data when it is actively servicing a wireless terminal and collects non-participatory WAP data when it is not actively servicing a wireless terminal but is instead merely listening. In either embodiment, the first radio and/or the second radio provide the non-participatory data (and optionally the participatory WAP data) to the processor.

After receipt of the non-participatory WAP data and optionally the participatory WAP data, the WAP creates a WAP operational report (step 916). In particular, the processor of the WAP creates the WAP operational report. The processor then sends the WAP operational report to the air controller (step 918). The WAP may send the WAP operational report to the air controller periodically or immediately after its creation, or upon request by the air controller. As is evidenced, the WAP operational report may not be created on a periodic fashion because of variations in loading on the WLAN. During high usage times, e.g., during the day, more participatory WAP data and non-participatory WAP data is collected than during low usage times, e.g., night time hours. Thus, the WAP operational reports may be sent from the WAP to the air controller as is required considering particular system loading conditions.

When the processor of the WAP receives directions from the air controller (at step 920), the processor performs at least one of three different operations. In a first one of these operations, the processor alters the gain pattern of the directional antenna of the corresponding WAP (step 922). In a second operation, the processor alters the transmit power of the first radio of the WAP (step 924). In a third operation, the processor alters the channel allocation of the first radio (step 926). From each of step 918 and 926, operation returns to step 902.

Referring now to FIG. 9B, operations regarding WLAN system evaluation are discussed. Generally, immediately after installation, or at a subsequent time, the WLAN is evaluated for its coverage and performance. As one step of this evaluation, the relative radio positions of the WAPs of the WLAN are determined. One technique for this determination is accomplished at steps 930-948. As a first operation in this evaluation, a WAP receives a system evaluation direction from the air controller (step 930). In response to the system evaluation direction, the WAP listens for beacons of other WAPs (step 932). These beacons will typically be on particular channels at particular times. When the WAP hears a beacon, it controls its directional antenna in the direction of the beacon (step 934). Then, the WAP measures the maximum signal strength of the beacon (step 936). Steps 932, 934, and 936 will be repeated for each beacon. The air controller, in the system evaluation direction, may identify the beacon channels and beacon intervals to the WAPs. Alternately, the WAP will simply scan for beacons on each serviced channel, record information, and continue until directed to stop by the air controller. Finally, the WAP prepares a report regarding the beacon and provides the report to the air controller (step 938).

At step 940, the WAP receives a system beacon direction from the air controller (step 940). In response to the system beacon direction, the WAP selects a channel (step 942) and transmits a beacon on the selected channel (step 944). In one operation, the WAP transmits in a non-directional manner. However, in another operation, the WAP transmits with a previously determined directionality. With step 944 complete, the WAP optionally selects a new channel based upon the received direction or based upon another received direction (step 946) and transmits a beacon on the new selected channel (step 948). From steps 938 and 948 operation returns to step 902.

Figure 10:
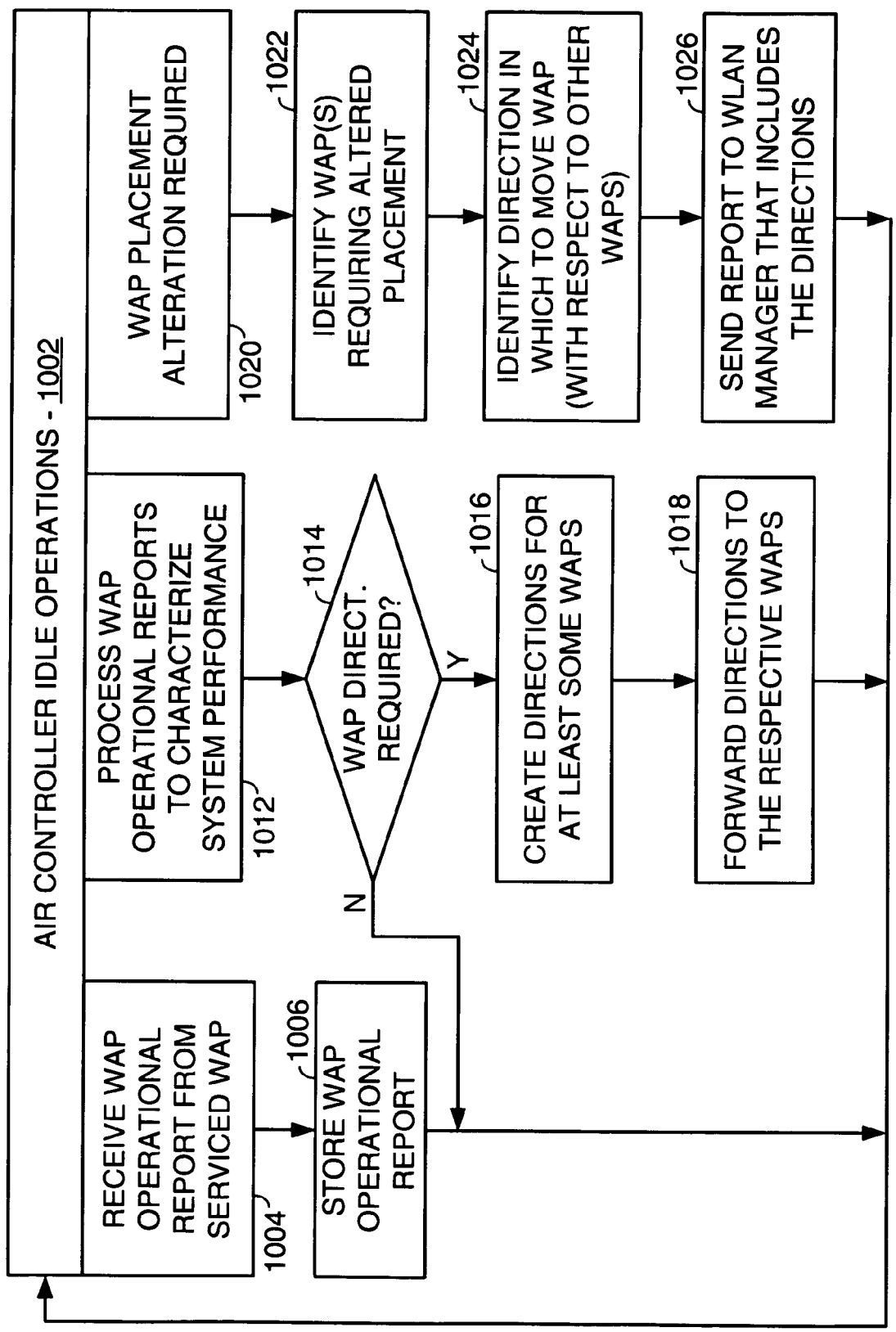
FIG. 10 is a logic diagram illustrating air controller operations according to the present invention.

FIG. 10 is a logic diagram illustrating air controller operations according to the present invention. When the air controller is not performing operations of the present invention, it is either idle or performing other of its operations (step 1002). During a first operation of the present invention, the air controller receives a WAP operational report from a serviced WAP (step 1004). The air controller then stores the WAP operational report in its memory (step 1006). From step 1006 operation returns to step 1002.

In a second operation from step 1002, the air controller processes the received WAP operational reports to characterize system performance of the WLAN (step 1012). Based upon this system performance characterization, the WAP determines whether WAP directions are required (step 1014). If WAP directions are not required, operation proceeds from step 1014 to step 1002. However, if WAP directions are required, the air controller creates directions for at least some of the WAPs of the serviced WLAN (step 1016). Then, the air controller forwards the directions to respective WAPs (step 1018). Because the directions may only alter operation of one of the WAPs, at step 1018, the directions are forwarded to only targeted WAPs of the plurality of WAPs of the WLAN. However, in other operations, the directions are forwarded to a number of respective WAPs that are requested to alter their operations. In still another operation, the directions are broadcast to all managed WAPs. From step 1018 operations returns to step 1002.

According to a further operation, the air controller may determine that it can no longer simply adjust operations of the WAPs but that WAP placement alterations are required (step 1020). In such case, the air controller identifies the WAP(s) requiring altered placement (step 1022). Such determination may be made by the air controller based upon its continued attempted adjustment of the WAP without producing sufficient WLAN system performance improvement. In its operations, the air controller may also identify a direction in which to move a WAP with respect to other WAPs (step 1024). The air controller then sends a report to a WLAN manager that includes directions for WAP movement (step 1026). From step 1026 operation returns to step 1002.

Figure 11:
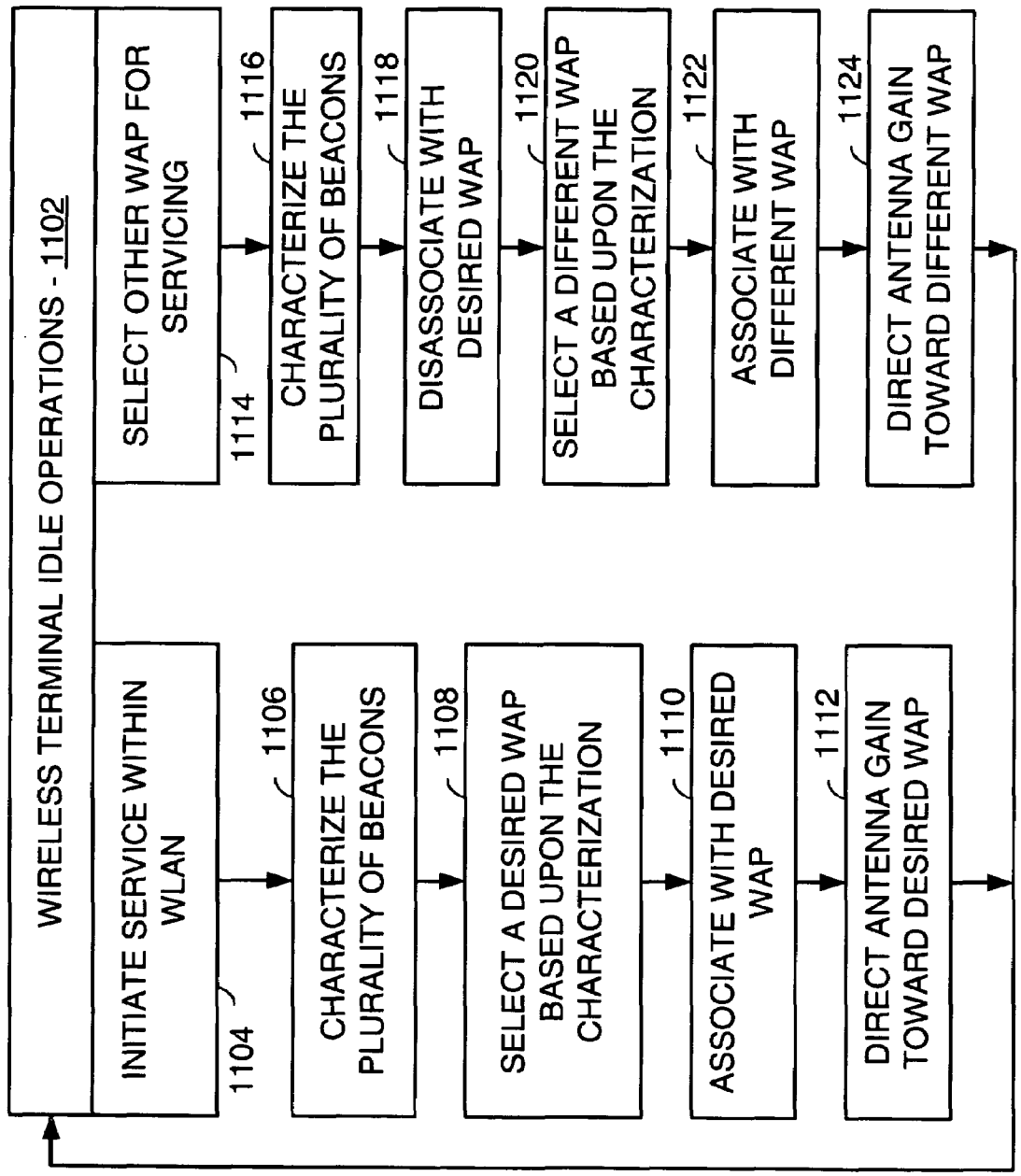
FIG. 11 is a logic diagram illustrating mobile terminal operations according to one embodiment of the present invention.

FIG. 11 is a logic diagram illustrating mobile terminal operations according to one embodiment of the present invention. At step 1102 the wireless terminal is idle. From step 1102 the wireless terminal may initiate service within the WLAN (step 1104) or select another servicing WAP (step 1114). From step 1104, the wireless terminal listens to a plurality of beacons transmitted by a corresponding plurality of Wireless Access Points (WAPs) of the WLAN. The wireless terminal then characterizes the plurality of beacons with regard to signal quality (step 1106). Based upon the characterization, the wireless terminal selects a desired WAP of the plurality of WAPs (step 1108). The wireless terminal then associates with the desired WAP of the plurality of WAPs (step 1110). Finally, the wireless terminal adjusts a gain vector of a servicing antenna of the wireless terminal so that it is substantially directed toward the desired WAP of the plurality of WAPs (step 1112).

From step 1114, the wireless terminal again listens to the plurality of beacons and again characterizes the plurality of beacons with regard to signal quality (step 1116). Based upon this characterization, disassociate with the desired WAP of the plurality of WAPs (step 1118), the wireless terminal may select a different WAP of the plurality of WAPs (step 1120), and associate with the different WAP of the plurality of WAPs (step 1122). The wireless terminal may then adjust the gain vector of the servicing antenna of the wireless terminal so that it is substantially directed toward the different WAP of the plurality of WAPs (step 1124).

At steps 1106 and 1116, in listening to the plurality of beacons, the wireless terminal may sweep the gain vector of the servicing antenna until a beacon is detected. When the beacon is detected the wireless terminal may then characterize the beacon. In this operation, the beacon is characterized when the gain vector of the servicing antenna is substantially directed toward the beacon.

Characterization of the beacon at steps 1106 and/or 1116 may take one or more of a number of characterization operations. In a first operation, characterizing the plurality of beacons with regard to signal quality includes measuring signal strengths of at least some of the plurality of beacons. In a second operation, characterizing the plurality of beacons with regard to signal quality includes measuring a signal-to-noise ratio corresponding to at least some of the plurality of beacons. In a third operation, characterizing the plurality of beacons with regard to signal quality includes receiving loading data carried by at least some of the plurality of beacons and processing received loading data to determine the desired WAP of the plurality of WAPs.

In a fourth operation, characterizing the plurality of beacons with regard to signal quality includes receiving capability data carried by at least some of the plurality of beacons, wherein the capability data indicates whether a corresponding access point is capable of directional antenna servicing and processing received capability data to determine the desired WAP of the plurality of WAPs. In a fifth operation, characterizing the plurality of beacons with regard to signal quality includes receiving capability data carried by at least some of the plurality of beacons, wherein the capability data indicates whether a corresponding access point is capable of transmit power control and processing received capability data to determine the desired WAP of the plurality of WAPs.

Figure 12:
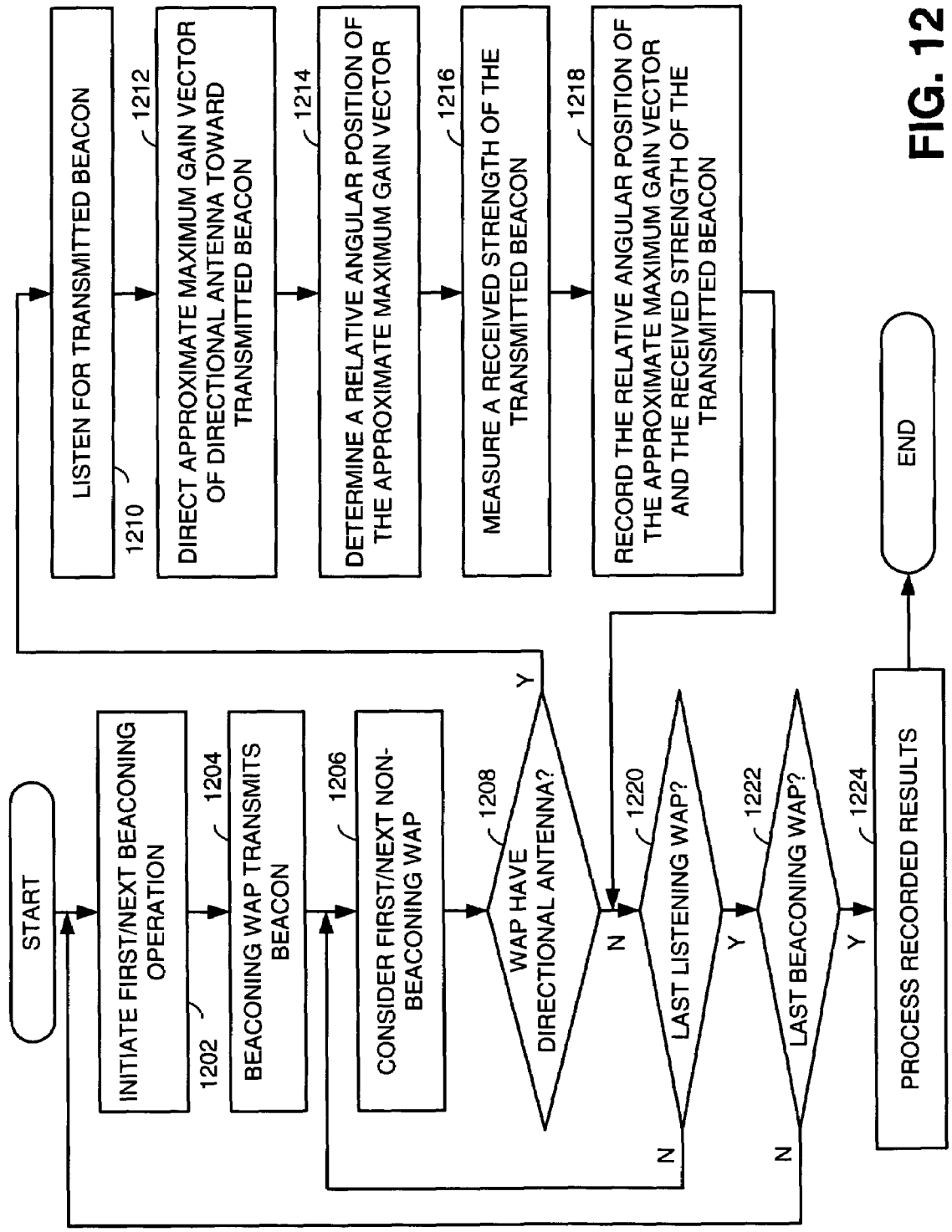
FIG. 12 is a logic diagram illustrating operation according to an embodiment of the present invention in gathering information used to determine relative radio positions of WAPs within a WLAN.

FIG. 12 is a logic diagram illustrating operation according to an embodiment of the present invention in gathering information used to determine relative radio positions of WAPs within a WLAN. The operation of FIG. 12 is directed/supervised by the air controller 326, a computer coupled that controls the WAPs of the WLAN, a WAP, and/or another WLAN-coupled device having sufficient processing capability to perform this operation.

The operations of FIG. 12 include performing a plurality of beaconing operations, each of the beaconing operations corresponding to a respective WAP of the plurality of WAPs such that during the beaconing operation the respective WAP transmits a substantially constant power beacon. This operation would typically be initiated after initial deployment of the WAPs of the WLAN to determine whether the WAP placement is acceptable. The operation may also be performed periodically to ensure that service coverage provided by the WAPs of the WLAN is sufficient to meet the needs of the WLAN users. The air controller 326 (or other WLAN device) may be programmed to periodically perform these operations and to provide reports to the WLAN manager.

Operation commences with a first beaconing operation (step 1202) wherein a beaconing WAP transmits as substantially constant power beacon (step 1204). During each beaconing operation, each non-beaconing WAP is separately considered and may be required to perform particular listening operations (step 1206). If the considered WAP has a directional antenna (as determined at step 1208) the WAP is required to perform a set of operations that begin with listening for the transmitted beacon (step 1210). The WAP, having a directional antenna that is controllable, then directs an approximate maximum gain vector of its directional antenna toward the transmitted beacon (step 1212). The WAP then determines a relative angular position of the approximate maximum gain vector (step 1214). The WAP then measures a received strength of the transmitted beacon (step 1216) and then records the relative angular position of the approximate maximum gain vector and the received strength of the transmitted beacon (step 1218). The measured strength of the transmitted beacon may be normalized based upon the known gain pattern of the directional antenna of the WAP.

With the operations of the particular WAP during the beaconing operation complete, it is next determined whether the currently considered WAP is the last WAP to be considered for the current beaconing operation (step 1220). If the currently considered WAP is not the last WAP to be considered for the beaconing operation, operation returns to step 1206. If so, operation proceeds to step 1222. Step 1220 is also reached from step 1208 when the currently considered WAP does not have a directional antenna. At step 1222 it is determined whether the currently beaconing WAP is the last WAP to be considered. If so, step 1224 is reached. If not, operation returns to step 1202. Step 1224 includes processing a plurality of recorded relative angular positions of the approximate maximum gain vectors and a plurality of recorded received strengths of the transmitted beacons to determine relative radio positions of the plurality of WAPs within the WLAN. From step 1224 operation ends.

Figure 13:
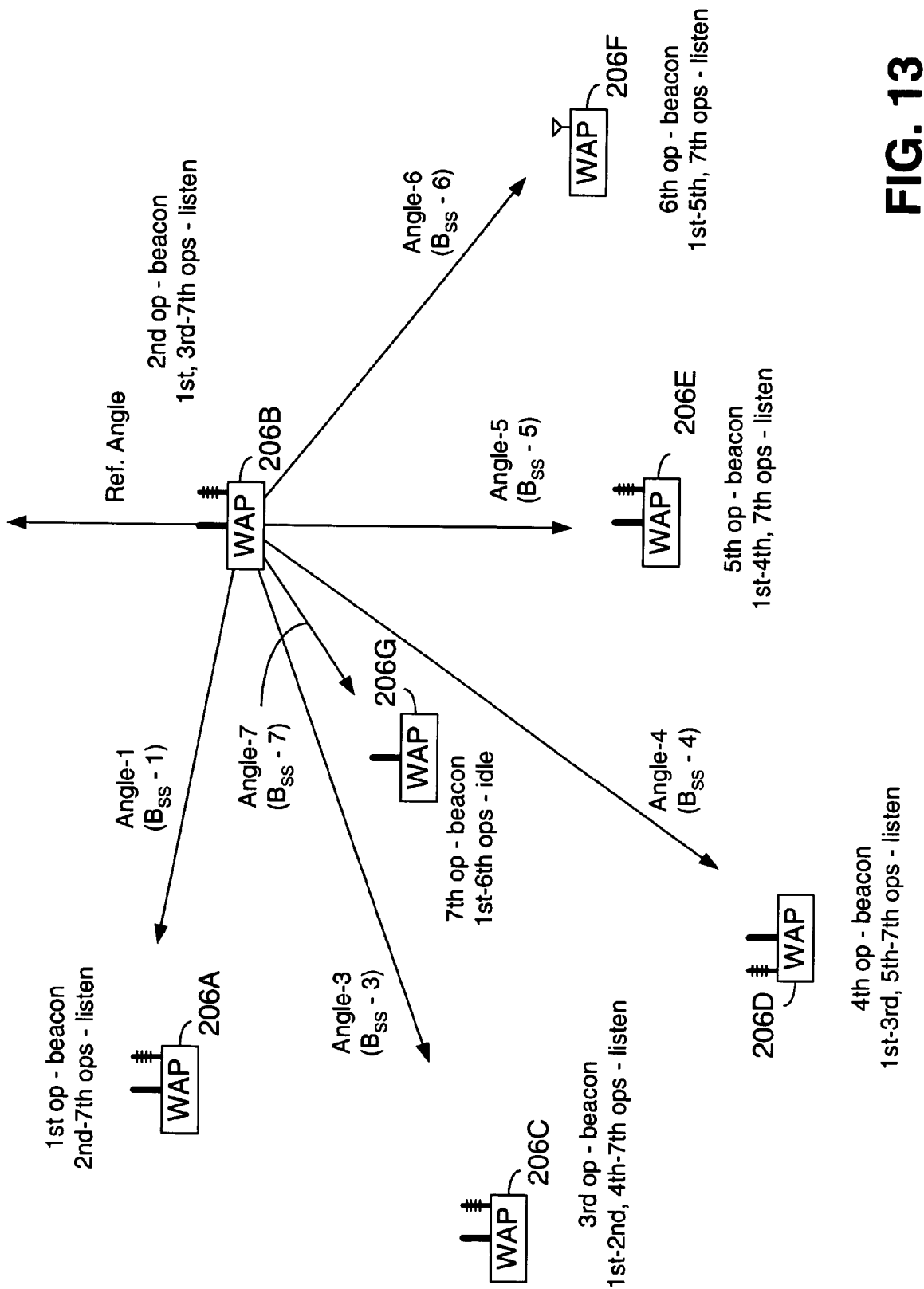
FIG. 13 is a system diagram employed to describe further the operation of FIG. 12.

FIG. 13 is a system diagram employed to describe further the operation of FIG. 12. As shown in FIG. 13, a plurality of WAPs 206A-206F correspond generally to WAPs 206A-206F of FIG. 2, with the addition of WAP 206G in FIG. 13. As is shown in FIG. 13, WAPs 206A-206F include directional antennas, while WAP 206G does not include a directional antenna but instead has a monopole antenna, which is non-directional. During a beaconing operation, as was described via FIG. 12, one of the WAPs will beacon, while each other of the WAPs having a directional antenna will listen for the transmitted beacon, direct an approximate maximum gain vector of its directional antenna toward the transmitted beacon to determine relative angular positions, measure signal strengths, and record this information. After this information has been recorded, each WAP having a directional antenna will have information regarding each other WAP within the WLAN.

FIG. 13 shows in particular how WAP 206B will have located each other WAP 206A and 206C-206F during this beaconing and locating operation. WAP 206B first establishes a reference angle with respect to which relative angles will be established. When WAP 206A beacons during a corresponding beaconing operation, WAP 206B directed its approximate maximum gain vector toward WAP 206A and records the angle shown as Angle-1. At the same time during the beaconing operation of WAP 206A, WAP 206B also measures and records the signal strength of the beacon denoted as $B_{SS}$-1.

During beaconing operations corresponding to WAPs 206C-206G, WAP 206B also records relative angular positions and signal strengths for these WAPs. After the plurality of beaconing operations finished, WAP 206B has collected the information illustrated in FIG. 3 and uploaded the information to a servicing device, e.g., the air controller 326, a master WAP, or another WLAN network processing device.

Figure 14:
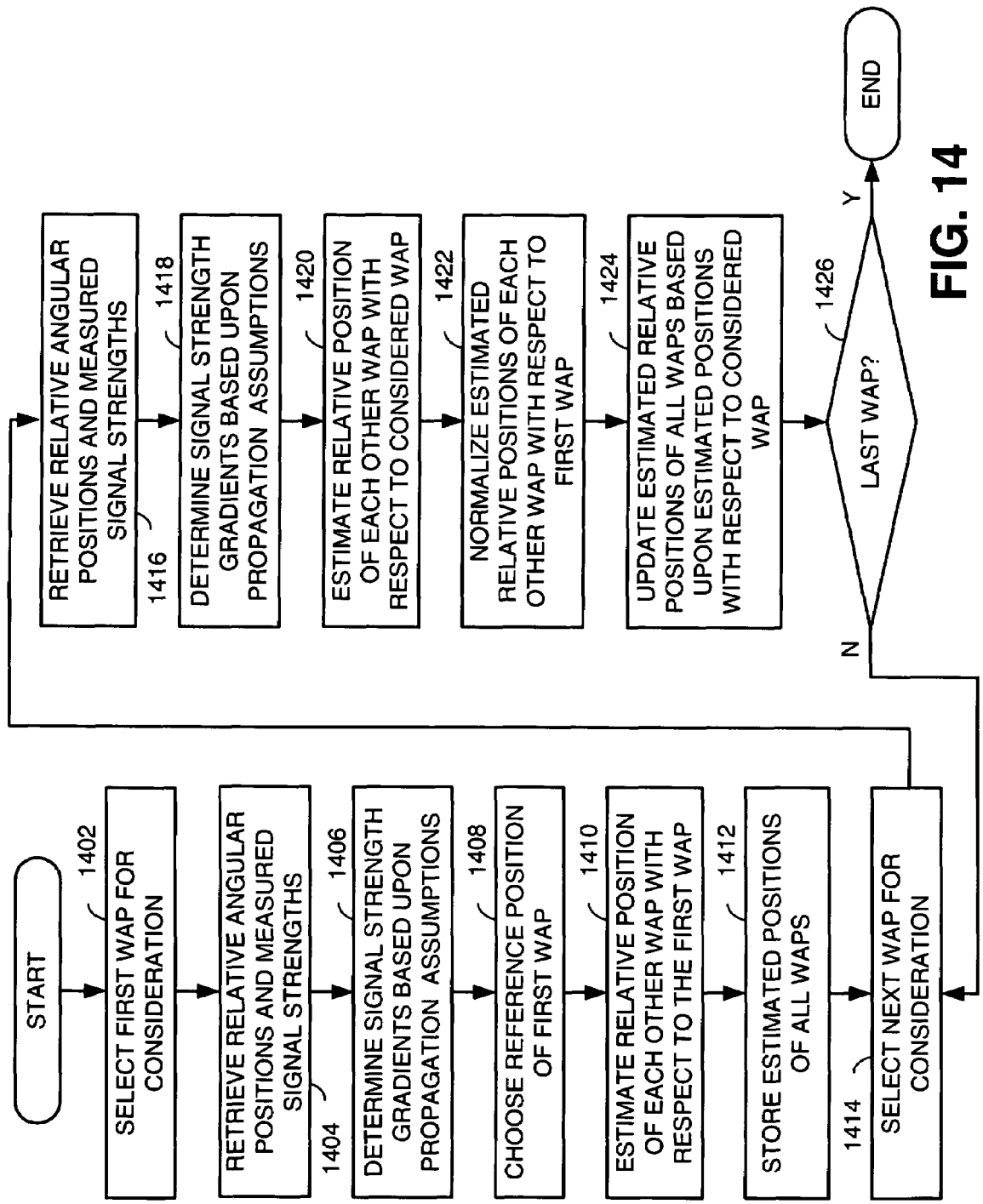
FIG. 14 is a logic diagram illustrating operation according to an embodiment of the present invention in using the information captured in the operations of FIG. 12 to determine relative radio positions of WAPs within the WLAN.

FIG. 14 is a logic diagram illustrating operation according to an embodiment of the present invention in using the information captured in the operations of FIG. 12 to determine relative radio positions of WAPs within the WLAN. FIG. 14 generally shows operation for processing the plurality of recorded relative angular positions of the approximate maximum gain vectors and the plurality of recorded received strengths of the transmitted beacons to determine the relative radio positions of the plurality of WAPs within the WLAN. Operation commences wherein a first WAP for consideration is selected (step 1402). Once the first WAP is selected, the relative angular positions and measured signal strengths that the first WAP recorded is retrieved (step 1404). Then, signal strength gradients based upon propagation assumptions are determined (step 1406). As is generally known, propagation of RF signals within premises, and particularly within frequency bands of interest, can be modeled using accepted modeling assumptions. These modeling assumptions, which may be modified based upon local conditions within the WLAN, are used to model RF propagation within the operations of FIG. 14.

In performing the operations of FIG. 14, the first WAP for consideration may be chosen based upon its relative position with respect to the other WAPs. For example, if the chosen WAP is known to be centrally located within the WLAN, the selection may be advantageous for more easily keeping track of the other WAPs. Thus, at step 1408, a reference position of the first WAP is chosen. It may be chosen to be at an origin of a two-dimensional Cartesian coordinate system. Next, based upon the relative angular positions and measured signal strengths collected by the first WAP in the propagation assumptions, the relative positions of each other WAP with respect to the first WAP are estimated (step 1410). The estimated relative positions are then stored at step 1412.

Once this operation is complete for the first WAP of the WLAN, a next WAP is considered (step 1414). The order in which the WAPs are considered may be chosen manually or may be chosen simply based upon the network address of the WAPs for which information was collected. With the next WAP selected, the relative angular positions and measured signal strengths collected by the considered WAP are then retrieved (step 1416). Then, signal strength gradients based upon the propagation assumptions and the retrieved measured signal strength is determined (step 1418). With this information retrieved and determined, the relative positions of each other WAP with respect to the considered WAP are estimated (step 1420). However, the estimated relative positions of the other WAPs with respect to the considered WAP may differ from the estimated relative positions as determined from the information collected by the first WAP. Thus, the estimated relative positions of each other WAP with respect to the considered WAP are normalized based upon the relative position of the considered WAP with respect to the first WAP (step 1422). Such normalization puts the relative positions into the coordinate system selected for the first WAP. Then, the estimated relative positions of all WAPs based upon estimated positions with respect to the considered WAP are updated (step 1424). Thus, a coordinate system transformation from the WAP under consideration to the first WAP must first be performed.

Then, the overall estimate of the relative positions of the WAPs within the WLAN is updated based upon the information that was collected by the considered WAP. Operations 1414-1424 are repeated for each WAP having a directional antenna that has collected information during the plurality of beaconing operations. Thus, the WAPs will be considered in order until the last WAP has been considered. When the last WAP is considered, as determined at step 1426, the operations of FIG. 14 end.

Figure 15:
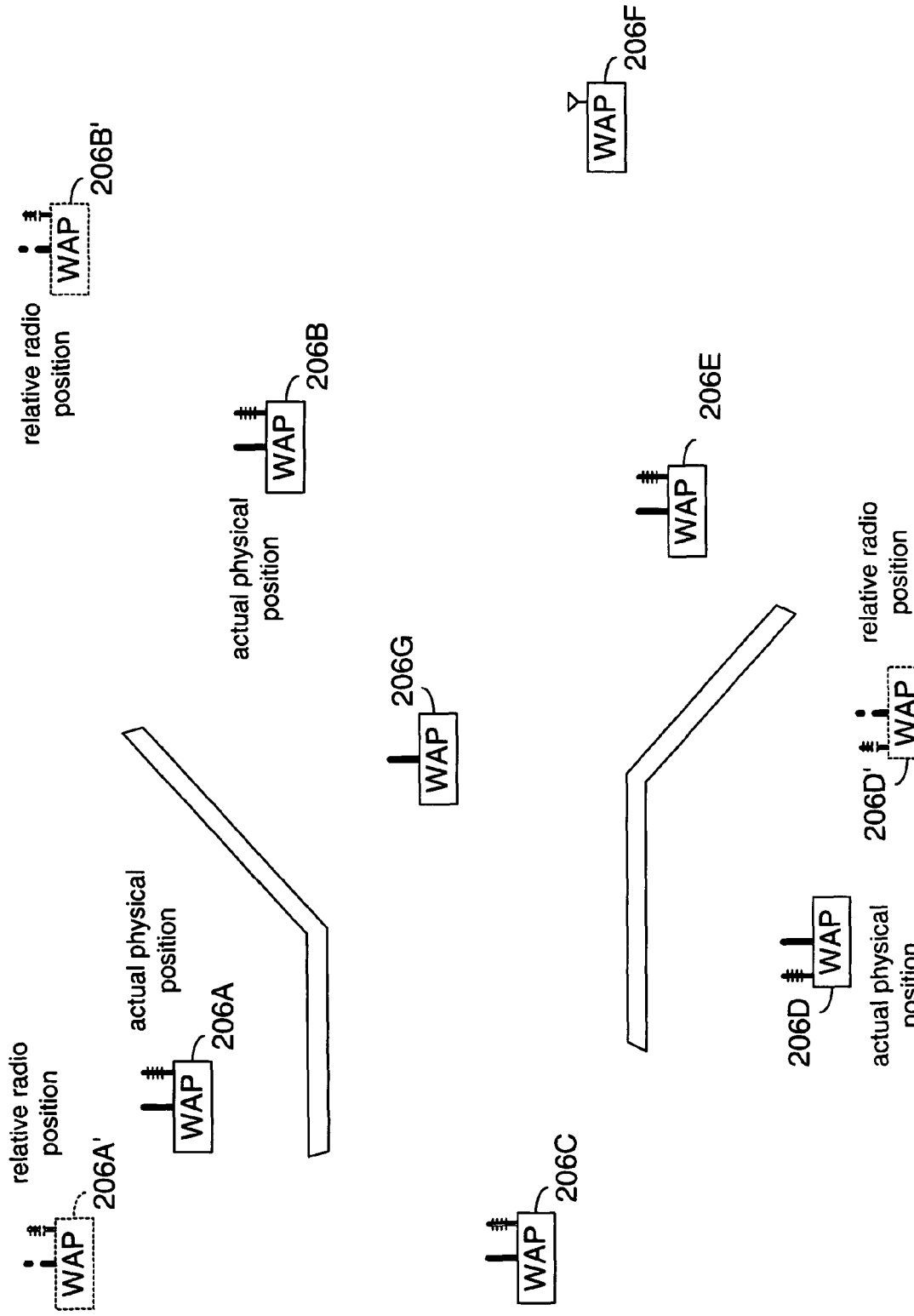
FIG. 15 is a system diagram illustrating the relationship between relative radio positions of WAPs of the WLAN and their actual physical positions.

FIG. 15 is a system diagram illustrating the relationship between relative radio positions of WAPs of the WLAN and their actual physical positions. The positions of WAPs 206A-206G are shown similarly to the positions illustrated in FIG. 2 and in FIG. 13. As is additionally shown in FIG. 15, relative radio positions of WAPs 206A, 206B, and 206D may differ from the actual physical position of these WAPs. Denoted at position 206A', is the relative radio position of WAP 206A. The relative radio position 206A', as compared to the actual physical position of 206A, is shown to be further from a central portion of the WLAN due to the fact that a barrier that attenuates radio signal propagation exists between the central portion of the WLAN and the actual physical position of WAP 206A. Likewise, the relative radio position of WAP 206B (shown at 206B') differs from the actual physical position of WAP 206B. Such is the case because of the attenuation of radio signals transmitted from WAP 206B due to conditions within the premises. Such is also the case with WAP 206D in which the relative radio position 206D prime differs from the actual physical division 206D of the WAP.

Figure 16:
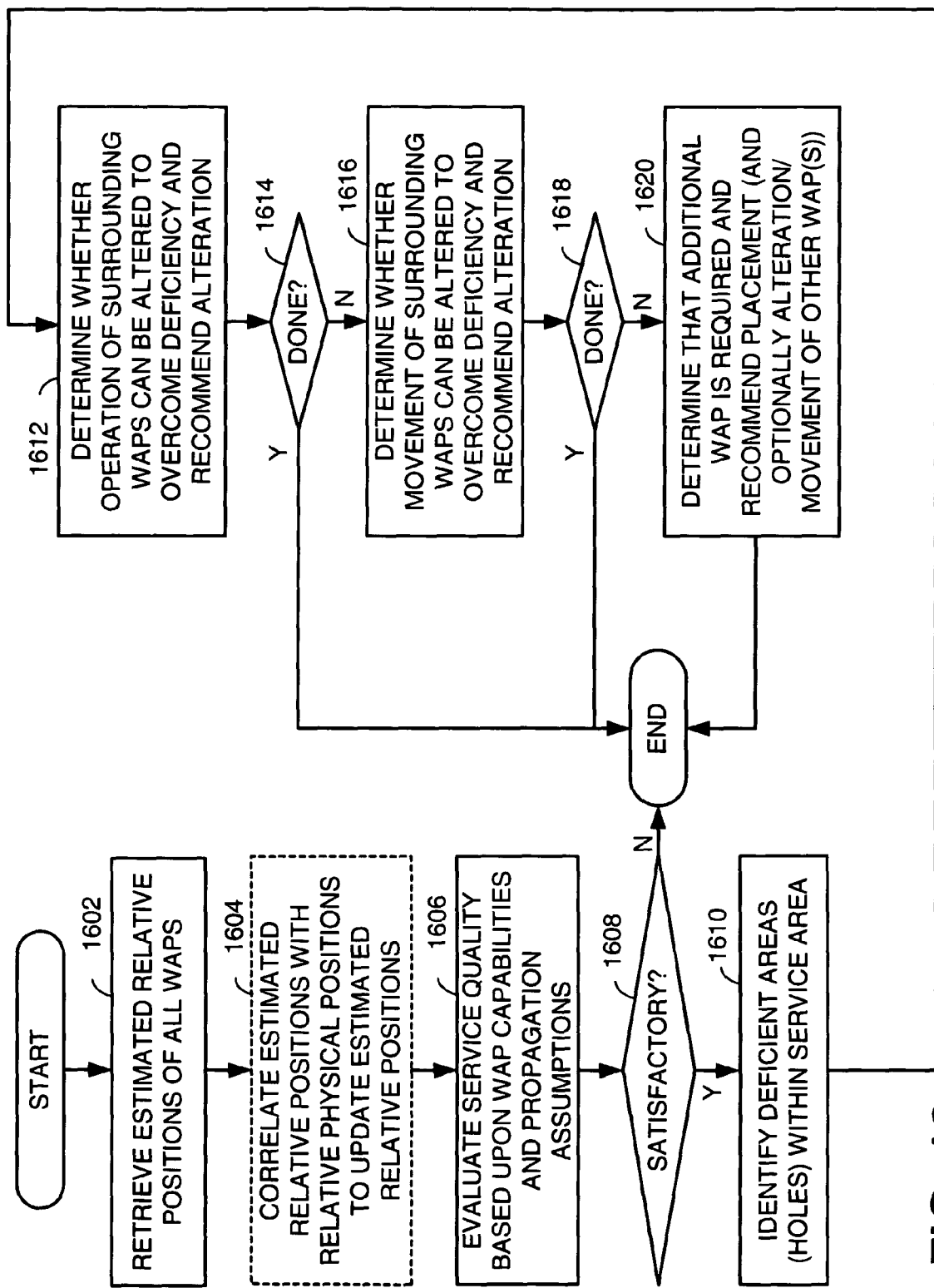
FIG. 16 is a logic diagram illustrating operation according to an embodiment of the present invention in recommending alterations to the WLAN to improve service quality.

FIG. 16 is a logic diagram illustrating operation according to an embodiment of the present invention in recommending alterations to the WLAN to improve service quality. The operations of FIG. 16 produce recommendations to a WLAN system administrator to ensure that service quality within the WLAN is sufficient to service the terminals within the WLAN. Operation commences wherein the estimated relative positions of all WAPs are retrieved (step 1602). These operations were performed as illustrated in FIG. 14. Additional information regarding actual physical positions of the plurality of WAPs may be correlated with the estimated relative physical positions to more accurately reflect their positions (step 1604). One manner in which the actual physical positions of the WAPs within the premises of the WLAN may be collected is by using a GPS unit to locate physically each of the WAPs. What should be kept in mind, however, is that the relative physical positions of the WAPs based upon RF propagation may be more valuable from a systems planning standpoint than is the actual physical positions of the WAPs. Such is the case because of interest is the radio frequency's signal strength and service quality that may be supported based thereupon within the service area of the WLAN.

Based upon the relative radio positions of all the WAPs as may have been updated or modified by the actual physical position information of the WAPs, the service quality based upon the WAP capabilities and propagation assumptions is evaluated (step 1606). If the service quality within all areas of the WLAN is satisfactory (as determined at step 1608), operation ends. However, if all areas of the service area of the WLAN do not have sufficient service quality, operation proceeds to step 1610 where deficient areas within the service area are identified. With the deficient areas within the service area of the WLAN identified, it is next determined whether operation of surrounding WAPs can be altered to overcome the deficiency. If such is the case, these alterations of operation are determined and recommended (step 1612). Alterations that may be recommended are altering the gain pattern of a directional antenna of a WAP, if the WAP has such a directional antenna. Another alteration that could be recommended would be to increase the transmit power of the WAP, and perhaps a corresponding antenna gain for the WAP. If alteration of the operation of the surrounding WAP can be performed, operation is complete (as determined at step 1614).

If alteration of the operation of the surrounding WAPs will not overcome the deficiencies identified, the next determination is made as to whether surrounding WAPs can be repositioned to overcome the deficiency (step 1616). If such is the case, then the repositioning is determined and recommended to the system administrator. If repositioning overcomes the deficiency (as determined at step 1618), operation is complete. However, if repositioning the WAPs cannot overcome this deficiency, it is determined that additional WAPs are required and placement of the WAP within the WLAN is recommended (step 1620).

It may be that there are more than one deficient service areas within the WLAN or a single one. The operations of FIG. 16 are performed for each deficient service area and recommendations made therefor. It may be that some service area deficiencies can be addressed by altering operations of WAPs. Movement of WAPs may address some deficiencies while other deficiencies may be addressed by the addition of WAPs. Thus, the operations of FIG. 16 are not limited to any one of the solutions.

Figure 17:
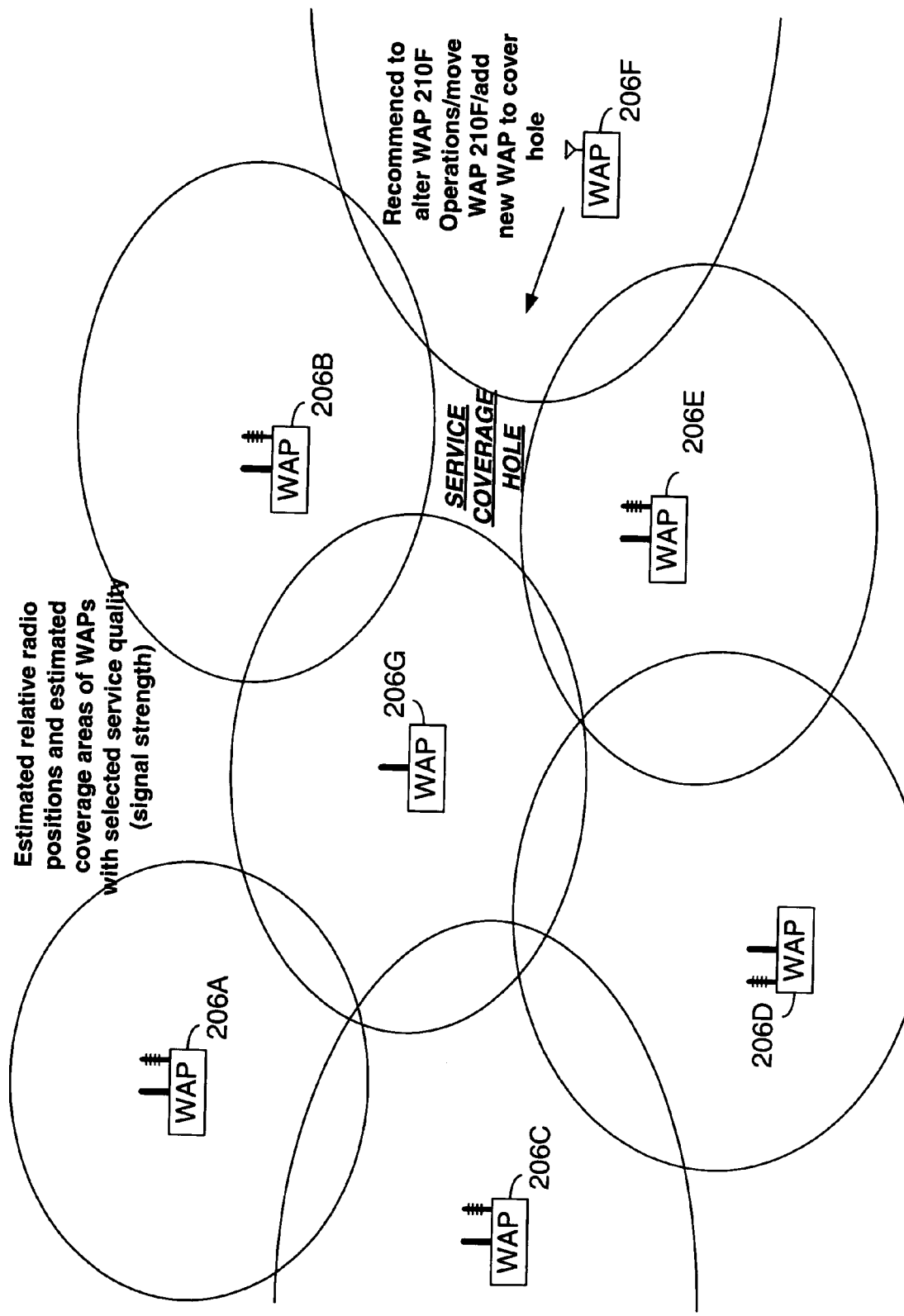
FIG. 17 is a system diagram illustrating an example of how the operation of FIG. 16 would be employed to improve service quality of the WLAN.

FIG. 17 is a system diagram illustrating an example of how the operation of FIG. 16 would be employed to improve service quality of the WLAN. The WAPs 206A-206F that were previously described with reference to FIG. 2, FIG. 13, and FIG. 15 are also shown in FIG. 17. As is shown in FIG. 17, a service coverage hole resides within an area of the WLAN surrounded by WAPs 206B, 206E, 206F, and 206G. According to the operation of FIG. 16, the method may suggest the alteration of operation of one of these surrounding WAPs to fill the service coverage hole. Another suggestion would be to move one of the WAPs, e.g., WAP 206F, to cover the service coverage hole with service. A still further recommendation would be to add an additional WAP within the service coverage hole. After such recommendation is implemented, the service coverage hole is filled by service via one of the surrounding WAPs or by a new WAP placed to cover the hole.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for operating a Wireless Local Area Network (WLAN) serviced by a plurality of Wireless Access Points (WAPs), at least some of the plurality of WAPs having directional antennas, the method comprising:
performing a plurality of beaconing operations, each of the beaconing operations corresponding to a respective WAP of the plurality of WAPs such that during the beaconing operation the respective WAP transmits a substantially constant power beacon;
during each beaconing operation, at least one non-beaconing WAP of the plurality of WAPs that has a directional antenna:
listening for the transmitted beacon;
directing an approximate maximum gain vector of the directional antenna toward the transmitted beacon;
determining a relative angular position of the approximate maximum gain vector;
measuring a received strength of the transmitted beacon; and
recording the relative angular position of the approximate maximum gain vector and the received strength of the transmitted beacon;
processing a plurality of recorded relative angular positions of the approximate maximum gain vectors and a plurality of recorded received strengths of the transmitted beacons to determine relative radio positions of the plurality of WAPs within the WLAN; and
based upon the relative radio positions of the plurality of WAPs within the WLAN:
determining that wireless coverage within a premises serviced by the plurality of WAPs is deficient in at least one location of the premises;
estimating relative geographical locations of the plurality of WAPs based upon the relative radio positions of the plurality of WAPs; and
based upon estimates of the relative geographical locations of the plurality of WAPs, determining a geographical relocating of the at least one of the plurality of WAPs that will remedy the deficiency.

2. The method of claim 1, wherein transmitting the substantially constant power beacon includes transmitting the beacon omni directionally.

3. The method of claim 1, wherein determining the repositioning comprises:
receiving relative physical positions of the plurality of WAPs;
correlating the relative physical positions of the plurality of WAPs with the relative radio positions of the plurality of WAPs;
determining the repositioning of at least one of the plurality of WAPs to remedy the deficiency is based upon the correlation of the relative physical positions of the plurality of WAPs with the relative radio positions of the plurality of WAPs.

4. The method of claim 1, further comprising, based upon the relative radio positions of the plurality of WAPs within the WLAN:
determining that wireless coverage within a premises serviced by the plurality of WAPs is deficient in at least one location of the premises; and
determining an alteration of an antenna gain pattern of at least one of the plurality of WAPs having a directional antenna to remedy the deficiency.

5. The method of claim 1, further comprising, based upon the relative radio positions of the plurality of WAPs within the WLAN:
determining that wireless coverage within a premises serviced by the plurality of WAPs is deficient in at least one location of the premises; and
determining an alteration of transmit power of at least one of the plurality of WAPs having a directional antenna to remedy the deficiency.

6. The method of claim 1, further comprising, based upon the relative radio positions of the plurality of WAPs within the WLAN:

determining that wireless coverage within a premises serviced by the plurality of WAPs is deficient in at least one location of the premises;

determining that an additional WAP is required to remedy the deficiency; and recommending a placement of the additional WAP with respect to the relative radio positions of the plurality of WAPs within the WLAN.

7. A Wireless Local Area Network (WLAN) processing component comprising:

a network interface that interfaces the WLAN processing component to a plurality of Wireless Access Points (WAPs) of the WLAN, at least some of the plurality of WAPs having directional antennas; and a processor communicatively coupled to the network interface that executes a group of instructions comprising:

a plurality of instructions that cause the WLAN processing component to direct the plurality of WAPs to perform a plurality of beaconing operations, each of the beaconing operations corresponding to a respective WAP of the plurality of WAPs such that during the beaconing operation the respective WAP transmits a substantially constant power beacon;

a plurality of instructions that cause the WLAN processing component to direct at least one non-beaconing WAP of the plurality of WAPs that has a directional antenna, during each beaconing operation, to:

listen for the transmitted beacon;

direct an approximate maximum gain vector of the directional antenna toward the transmitted beacon;

determine a relative angular position of the approximate maximum gain vector;

measure a received strength of the transmitted beacon; and record the relative angular position of the approximate maximum gain vector and the received strength of the transmitted beacon;

a plurality of instructions that cause the WLAN processing component to process a plurality of recorded relative angular positions of the approximate maximum gain vectors and a plurality of recorded received strengths of the transmitted beacons to determine relative radio positions of the plurality of WAPs within the WLAN;

a plurality of instructions that cause the WLAN processing component to, based upon the relative radio positions of the plurality of WAPs within the WLAN, determine that wireless coverage within a premises serviced by the plurality of WAPs is deficient in at least one location of the premises;

a plurality of instructions that cause the WLAN processing component to estimate the relative geographical locations of the plurality of WAPs based upon the relative radio positions of the plurality of WAPs; and a plurality of instructions that cause the WLAN processing component to, based upon estimates of the relative geographical locations of the plurality of WAPs, determine a geographical relocating of the at least one of the plurality of WAPs that will remedy the deficiency.

8. The WLAN processing component of claim 7, wherein the processor further executes a plurality of instructions that cause the WLAN processing component to direct the respective WAP to transmit the substantially constant power beacon omni directionally.

9. The WLAN processing component of claim 7, wherein the plurality of instructions that cause the WLAN processing component to determine a repositioning of at least one of the plurality of WAPs to remedy the deficiency include:

a plurality of instructions that cause the WLAN processing component to receive relative physical positions of the plurality of WAPs;

a plurality of instructions that cause the WLAN processing component to correlate the relative physical positions of the plurality of WAPs with the relative radio positions of the plurality of WAPs; and a plurality of instructions that cause the WLAN processing component to determine the repositioning of at least one of the plurality of WAPs to remedy the deficiency based upon the correlation of the relative physical positions of the plurality of WAPs with the relative radio positions of the plurality of WAPs.

10. The WLAN processing component of claim 7, wherein the processor further executes:

a plurality of instructions that cause the WLAN processing component to, based upon the relative radio positions of the plurality of WAPs within the WLAN, determine that wireless coverage within a premises serviced by the plurality of WAPs is deficient in at least one location of the premises; and a plurality of instructions that cause the WLAN processing component to determine an alteration of an antenna gain pattern of at least one of the plurality of WAPs having a directional antenna to remedy the deficiency.

11. The WLAN processing component of claim 7, wherein the processor further executes:

a plurality of instructions that cause the WLAN processing component to, based upon the relative radio positions of the plurality of WAPs within the WLAN, determine that wireless coverage within a premises serviced by the plurality of WAPs is deficient in at least one location of the premises; and a plurality of instructions that cause the WLAN processing component to, based upon the relative radio positions of the plurality of WAPs within the WLAN, determine an alteration of transmit power of at least one of the plurality of WAPs having a directional antenna to remedy the deficiency.

12. The WLAN processing component of claim 7, wherein the processor further executes:

a plurality of instructions that cause the WLAN processing component to, based upon the relative radio positions of the plurality of WAPs within the WLAN, determine that wireless coverage within a premises serviced by the plurality of WAPs is deficient in at least one location of the premises;

a plurality of instructions that cause the WLAN processing component to, based upon the relative radio positions of the plurality of WAPs within the WLAN, determine that an additional WAP is required to remedy the deficiency; and a plurality of instructions that cause the WLAN processing component to, based upon the relative radio positions of the plurality of WAPs within the WLAN, recommend a placement of the additional WAP with respect to the relative radio positions of the plurality of WAPs within the WLAN.

13. A Wireless Local Area Network (WLAN) processing component comprising:

a network interface that interfaces the WLAN processing component to a plurality of Wireless Access Points (WAPs) of the WLAN, at least some of the plurality of WAPs having directional antennas;

means for performing a plurality of beaconing operations, each of the beaconing operations corresponding to a respective WAP of the plurality of WAPs such that during the beaconing operation the respective WAP transmits a substantially constant power beacon;

means for, during each beaconing operation, at least one non-beaconing WAP of the plurality of WAPs that has a directional antenna:
  listening for the transmitted beacon;
  directing an approximate maximum gain vector of the directional antenna toward the transmitted beacon;
  determining a relative angular position of the approximate maximum gain vector;
  measuring a received strength of the transmitted beacon; and
  recording the relative angular position of the approximate maximum gain vector and the received strength of the transmitted beacon;

means for processing a plurality of recorded relative angular positions of the approximate maximum gain vectors and a plurality of recorded received strengths of the transmitted beacons to determine relative radio positions of the plurality of WAPs within the WLAN;

means for, based upon the relative radio positions of the plurality of WAPs within the WLAN, determining that wireless coverage within a premises serviced by the plurality of WAPs is deficient in at least one location of the premises;

means for estimating relative geographical locations of the plurality of WAPs based upon the relative radio positions of the plurality of WAPs; and means for, based upon estimates of the relative geographical locations of the plurality of WAPs, determining a geographical relocating of the at least one of the plurality of WAPs that will remedy the deficiency.

14. The WLAN processing component of claim 13, further comprising:
  means for, based upon the relative radio positions of the plurality of WAPs within the WLAN, determining that wireless coverage within a premises serviced by the plurality of WAPs is deficient in at least one location of the premises; and
  means for determining an alteration of an antenna gain pattern of at least one of the plurality of WAPs having a directional antenna to remedy the deficiency.

15. The WLAN processing component of claim 13, further comprising:
  means for, based upon the relative radio positions of the plurality of WAPs within the WLAN, determining that wireless coverage within a premises serviced by the plurality of WAPs is deficient in at least one location of the premises; and
  means for determining an alteration of transmit power of at least one of the plurality of WAPs having a directional antenna to remedy the deficiency.

16. The WLAN processing component of claim 13, further comprising:
  means for, based upon the relative radio positions of the plurality of WAPs within the WLAN, determining that wireless coverage within a premises serviced by the plurality of WAPs is deficient in at least one location of the premises;
  means for determining that an additional WAP is required to remedy the deficiency; and
  means for recommending a placement of the additional WAP with respect to the relative radio positions of the plurality of WAPs within the WLAN.

* * * * *